(12) United States Patent  
Tatsumi et al.

(10) Patent No.: US 8,948,168 B2  
(45) Date of Patent: Feb. 3, 2015

(54) NETWORK SYSTEM

(75) Inventors: Tomoyoshi Tatsumi, Tsuchiura (JP); Shingo Sugawara, Tsuchiura (JP); Koichiro Seto, Amimachi (JP)

(73) Assignee: Hitachi Metals, Ltd., Tokyo (JP)

( * ) Notice: Subject to any disclaimer, the term of this patent is extended or adjusted under 35 U.S.C. 154(b) by 57 days.

(21) Appl. No.: 13/551,515

(22) Filed: Jul. 17, 2012

(65) Prior Publication Data

US 2013/0022044 A1 Jan. 24, 2013

(30) Foreign Application Priority Data

Jul. 19, 2011 (JP) ................... 2011-157774

(51) Int. Cl.
*H04W 40/00* (2009.01)
*H04L 12/933* (2013.01)

(52) U.S. Cl.
CPC ....................................... *H04L 49/15* (2013.01)
USPC ............ 370/389; 370/256; 370/400; 370/408

(58) Field of Classification Search
USPC .................. 370/352, 354, 357, 360, 389, 392
See application file for complete search history.

(56) References Cited

U.S. PATENT DOCUMENTS

| | | | |
|---|---|---|---|
| 5,838,960 A * | 11/1998 | Harriman, Jr. ................. | 712/221 |
| 6,058,116 A | 5/2000 | Hiscock et al. | |
| 6,195,349 B1 | 2/2001 | Hiscock et al. | |
| 7,139,267 B2 | 11/2006 | Lu et al. | |
| 8,693,341 B2 * | 4/2014 | Rajamanickam et al. ..... | 370/238 |
| 2008/0068985 A1* | 3/2008 | Mieno .......................... | 370/217 |
| 2010/0316053 A1 | 12/2010 | Miyoshi et al. | |

FOREIGN PATENT DOCUMENTS

JP 2010-288168 A 12/2010
WO WO 2012010868 A1 * 1/2012

* cited by examiner

*Primary Examiner* — Un C Cho
*Assistant Examiner* — Natali N Pascual Peguero
(74) *Attorney, Agent, or Firm* — McGinn IP Law Group, PLLC

(57) ABSTRACT

A network system includes lower switches and upper switches connected to the lower switches. Each of the upper switches transmits a first notification frame containing a connected lower switch number information indicative of the number of the lower switches connected to each of the upper switches, to the lower switches connected to each of the upper switches. Each of the lower switches configures a link aggregation group for ports which received the first notification frames each of which contains a maximum value of the connected lower switch number information among the connected lower switch number informations contained in the received first notification frames.

20 Claims, 22 Drawing Sheets

| DA | SA | ..... | TYPE | PAYLOAD | FCS |

50a  50b       50c    50d       50e

50f: LOWER SWITCH IDENTIFICATION INFORMATION

IDENTIFICATION INFORMATION TABLE (42c)

| PORT | LOWER SWITCH IDENTIFICATION INFORMATION |
|---|---|
| 38a | 34a |
| 38b | 34a |
| 38c | 34b |
| 38d | 34b |

| LAG TABLE | |
|---|---|
| LAG ID | PORT |
| 52a | 38a |
| | 38b |
| 52b | 38c |
| | 38d |

CONNECTION INFORMATION TABLE (82c)

| PORT | CONNECTED LOWER SWITCH NUMBER INFORMATION | CONNECTED LOWER SWITCH LIST INFORMATION | UPPER SWITCH IDENTIFICATION INFORMATION |
|---|---|---|---|
| 58a | 3 | 34a,34b,34c | 32a |
| 58b | 3 | 34a,34b,34c | 32a |
| 58c | 3 | 34a,34b,34c | 32b |
| 58d | 3 | 34a,34b,34c | 32b |
| 58e | 3 | 34a,34b,34c | 32c |
| 58f | 3 | 34a,34b,34c | 32c |

FIG.26

LOWER SWITCH 34a CONNECTION INFORMATION TABLE (82c)

| PORT | CONNECTED LOWER SWITCH NUMBER INFORMATION | CONNECTED LOWER SWITCH LIST INFORMATION | UPPER SWITCH IDENTIFICATION INFORMATION |
|---|---|---|---|
| 58a | 2 | 34a,34b | 32a |
| 58b | 2 | 34a,34b | 32a |
| 58c | 2 | 34a,34c | 32b |
| 58d | 2 | 34a,34c | 32b |

FIG.27

LOWER SWITCH 34b CONNECTION INFORMATION TABLE 82c

| PORT | CONNECTED LOWER SWITCH NUMBER INFORMATION | CONNECTED LOWER SWITCH LIST INFORMATION | UPPER SWITCH IDENTIFICATION INFORMATION |
|---|---|---|---|
| 58a | 2 | 34a,34b | 32a |
| 58b | 2 | 34a,34b | 32a |
| 58e | 2 | 34b,34c | 32c |
| 58f | 2 | 34b,34c | 32c |

FIG.28

LOWER SWITCH 34c CONNECTION INFORMATION TABLE 82c

| PORT | CONNECTED LOWER SWITCH NUMBER INFORMATION | CONNECTED LOWER SWITCH LIST INFORMATION | UPPER SWITCH IDENTIFICATION INFORMATION |
|---|---|---|---|
| 58c | 2 | 34a,34c | 32b |
| 58d | 2 | 34a,34c | 32b |
| 58e | 2 | 34b,34c | 32c |
| 58f | 2 | 34b,34c | 32c |

FIG.29

CONNECTION INFORMATION TABLE (82c)

| PORT | CONNECTED LOWER SWITCH NUMBER INFORMATION | CONNECTED LOWER SWITCH LIST INFORMATION | UPPER SWITCH IDENTIFICATION INFORMATION |
|---|---|---|---|
| 58a | 2 | 34a,34b | 32a |
| 58b | 2 | 34a,34b | 32a |
| 58c | 2 | 34a,34b | 32b |
| 58d | 2 | 34a,34b | 32b |
| 58e | 3 | 34a,34b,34c | 32c |
| 58f | 3 | 34a,34b,34c | 32c |

NETWORK SYSTEM

The present application is based on Japanese patent application No. 2011-157774 filed on Jul. 19, 2011, the entire contents of which are incorporated herein by reference.

BACKGROUND OF THE INVENTION

1. Field of the Invention

This invention relates to a two-stage network system with two-stage connected switching hubs.

2. Description of the Related Art

Conventionally, a network system with multistage connected switches such as FAT Tree has been known. JP-A-2010-288168 discloses an example of the conventional network systems with multistage connected switches. For example, a two-stage network system includes a plurality of lower layer leaf switches (lower switches), and a plurality of upper layer root switches (upper switches). Each lower switch is connected to all the upper switches. Also, the lower switches are connected to a desired number of terminals. Transmission and reception of frames between the different lower switches is made via any one of the plural upper switches.

SUMMARY OF THE INVENTION

In the two-stage network system, it is conceivable to configure link aggregation groups (LAGs) for ports of the lower switches connected to the upper switches among all the ports of the lower switches. The lower switches sort frames into the plural upper switches in accordance with the LAGs and transmit them. According to this structure, the transmission and reception of the frames between the lower switches can be distributed to the plural upper switches.

Here, in the two-stage network system, the number of upper switches and the number of lower switches, or, a connection configuration and the like with a transmission medium between the upper switches and the lower switches may be changed due to fault occurrence and specification alteration of the network system. If there is a change like this, it is necessary to reconfigure the LAGs for the lower switches.

However, there is a problem in that manual reconfiguring operation of the LAGs for the lower switches would be complicated for an administer.

In view of the above-mentioned circumstances, it is an object of the invention to provide a two-stage network system in which lower switches are capable of automatically configuring the LAGs.

The invention provides a network system comprising lower switches; and upper switches connected to the lower switches, in which each of the upper switches transmits a first notification frame containing a connected lower switch number information indicative of a number of the lower switches connected to each of the upper switches, to the lower switches connected to each of the upper switches, and each of the lower switches configures a link aggregation group for ports which received the first notification frames each of which contains a maximum value of the connected lower switch number information among the connected lower switch number informations contained in the received first notification frames.

Further, each of the lower switches may transmit a second notification frame containing an identification information on each of the lower switches, to the upper switches connected to each of the lower switches, and each of the upper switches may determine the number of the lower switches connected to each of the upper switches, based on the identification information contained in the second notification frame received by each of the upper switches.

Still further, each of the upper switches may configure a link aggregation group for ports which received the second notification frame each of which contains a same identification information of the identification informations contained in the received second notification frames.

Each of the first notification frames may further contain a list information comprising the identification information indicative of the lower switches connected to each of the upper switches, and each of the lower switches may determine a connection state that some of the upper switches are not connected to some of the lower switches, when the list informations contained in the first notification frames transmitted from the different upper switches do not match each other.

Each of the first notification frames may further contain a list information comprising the identification information indicative of the lower switches connected to each of the upper switches, each of the lower switches may extract all of the identification informations contained in the list informations contained in the first notification frames received by each of the lower switches, and each of the lower switches may determine a connection state that there is no upper switch connected to all the lower switches, when all of the list informations do not contain all of the extracted identification informations.

Each of the lower switches may extract all of the identification informations contained in the list informations contained in the first notification frames received by the lower switches, and each of the lower switches may determine a connection state that there is no upper switch connected to all the lower switches, when all of the list informations do not contain all of the extracted identification informations.

Each of the upper switches and the lower switches may comprise a switching hub.

Effects of the Invention

According to the embodiment of the invention, the two-stage network system in which the lower switches are capable of automatically configuring LAGs is provided.

BRIEF DESCRIPTION OF THE DRAWINGS

The preferred embodiments according to the invention will be explained below referring to the drawings, wherein.

FIG. 23 is a table showing connection information table contents in FIG. 22;

FIG. 26 is a table showing connection information table contents registered in a lower switch in FIG. 25;

FIG. 27 is a table showing connection information table contents registered in a lower switch in FIG. 25;

FIG. 28 is a table showing connection information table contents registered in a lower switch in FIG. 25; and FIG. 29 is a table showing connection information table contents registered in a lower switch in the second embodiment, in the connected state shown in FIG. 14.

DETAILED DESCRIPTION OF THE PREFERRED EMBODIMENTS

Figure 1:
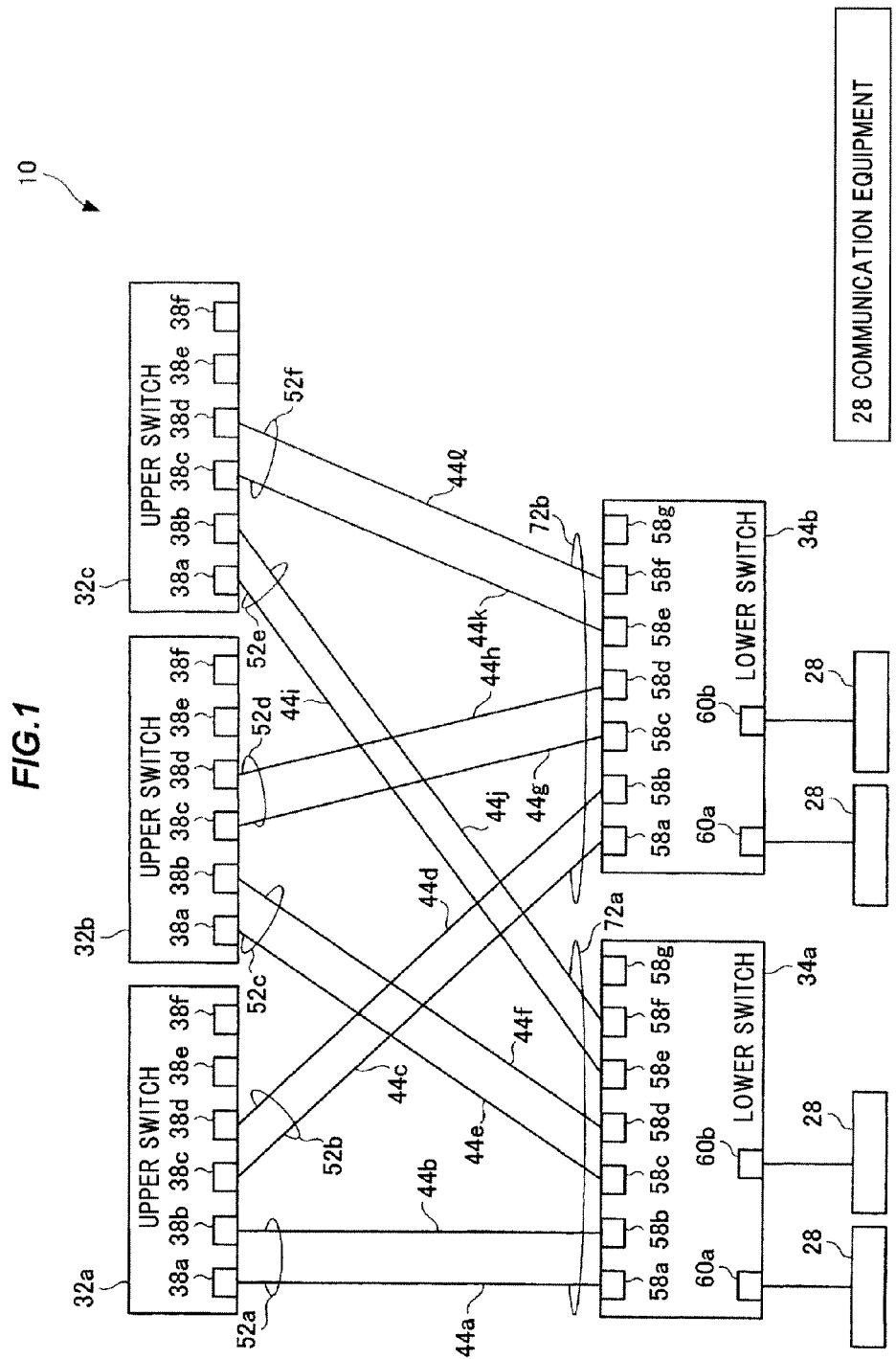
FIG. 1 is a diagram showing a network system in first embodiment.

Next, embodiments according to the invention will be described in conjunction with the appended drawings. FIG. 1 is a diagram illustrating a network system 10 in the first embodiment.

The network system 10 is a two-stage network system with two-stage connected switching hubs. The switching hubs comprise a plurality of lower switches and a plurality of upper switches connected to the lower switches. Namely, the switching hubs are classified into the lower switches and the upper switches connected to the lower switches. The network system 10 in the first embodiment shown in FIG. 1 includes three upper switches 32a, 32b, 32c and two lower switches 34a, 34b. It should be noted that the network system 10 in the first embodiment shown in FIG. 1 is shown as one example, and the numbers of the upper switches and lower switches are not limited thereto.

The upper switches 32a, 32b, 32c and the lower switches 34a, 34b are switching hubs with e.g. layer 2 data forwarding function in an OSI (Open Systems Interconnection) reference model, and each of which is provided with data forwarding function for layer 3 etc. as required. In the first embodiment, the upper switches 32a, 32b, 32c and the lower switches 34a, 34b are box-type switching hubs.

The lower switches 34a, 34b are connected to the upper switches 32a, 32b, 32c and to external communication equipments 28. The communication equipments 28 are specifically a server, a switching hub, a router, and the like. The lower switches 34a, 34b have a plurality of ports. Of the plural ports of the lower switches 34a, 34b, ports 58a, 58b are connected to an upper switch 32a, ports 58c, 58d are connected to an upper switch 32b, ports 58e, 58f are connected to an upper switch 32c, and ports 60a, 60b are connected to the communication equipments 28.

In the lower switches, the LAGs are configured for the ports connected to the upper switches. Specifically, LAGs 72a and 72b are configured for the plural ports 58a, 58b, 58c, 58d, 58e, 58f connected to the upper switches, of the plural ports of the lower switches 34a, 34b. The link aggregation is a technique to treat plural lines logically as one line. The plural ports for which the LAG is configured operate logically as one port.

The upper switches 32a, 32b, 32c have plural ports. Among the plural ports of the upper switches 32a, 32b, 32c, the ports 38a, 38b are connected to the lower switch 34a, while the ports 38c, 38d are connected to the lower switch 34b. In the upper switches, the LAG is configured for the ports connected to the same lower switch. Specifically, for the case of the upper switch 32a, a LAG 52a is configured for the ports 38a, 38b connected to the lower switch 34a and a LAG 52b is configured for the ports 38c, 38d connected to the lower switch 34b.

The network system in the embodiment of the invention is characterized in that operation is performed to configure the LAGs for the ports connected to the upper switches of the plural ports of the lower switches automatically.

Next, configurations of the upper switches and lower switches will be described below. Herein, the "upper switches 32a, 32b, 32c" are also referred to collectively as "upper switch 32" and the "lower switches 34a, 34b" are also referred to collectively as "lower switch 34."

(Upper Switch)

Figure 2:
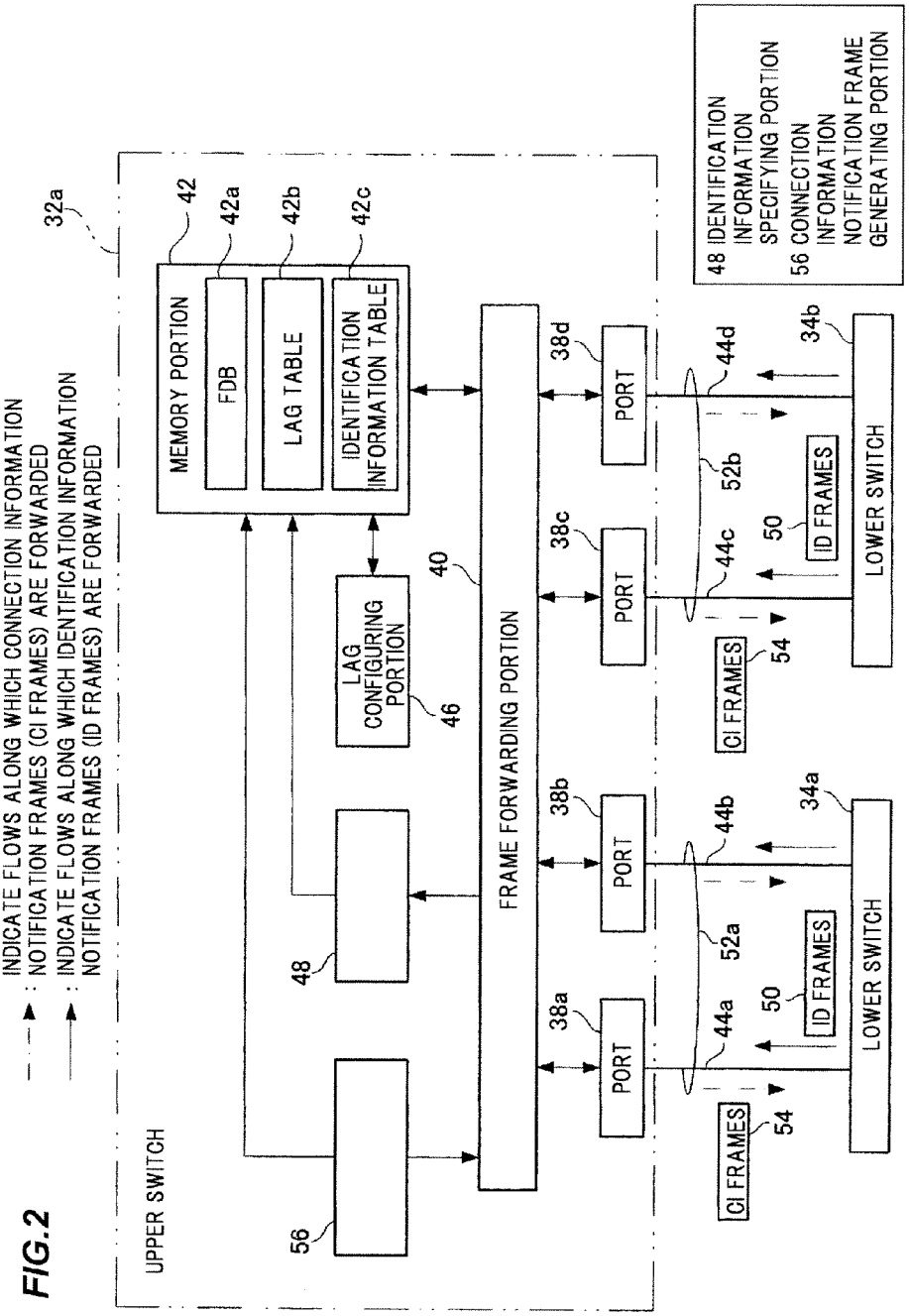
FIG. 2 is a block diagram schematically showing a functional configuration of an upper switch in FIG. 1.

FIG. 2 is a block diagram schematically showing a functional configuration of the upper switch 32a shown in FIG. 1. Herein, the functional configurations of the upper switches 32b, 32c shown in FIG. 1 are the same as that of the switch 32a, so that the descriptions of the upper switches 32b, 32c are omitted. The upper switch 32a has the plural ports 38a, 38b, 38c, 38d, a frame forwarding portion 40, and a memory portion 42.

In FIG. 2, each arrow indicated by broke line indicates a flow along which a connection information notification frame (CI frame) is forwarded, and each arrow indicated by solid line indicates a flow along which an identification information notification frame (ID frame) is forwarded. The same arrows are used in following drawings.

(Memory Portion)

The memory portion 42 is formed of e.g. a volatile rewritable RAM (random access memory). The memory portion 42 stores an FDB (forwarding database) 42a and a LAG table 42b.

(Port)

The ports 38a, 38b, 38c, 38d are connected to the lower switches 34, and are compatible with full-duplex communication. Specifically, in the upper switch 32a shown in FIG. 2, the ports 38a, 38b are connected to the lower switch 34a via network cables 44a, 44b as transmission mediums. The ports 38c, 38d are connected to the lower switch 34b via network cables 44c, 44d.

Herein, the "ports 38a, 38b, 38c, 38d" are also referred to collectively as "port 38," and the "network cables 44a, 44b, 44c, 44d" are also referred to collectively as "network cable 44." The number of ports 38 is not limited to the number shown in FIG. 2. The network cable 44 is compatible with full-duplex communication capable of simultaneous bidirectional frame forwarding, and each port 38 can transmit and receive frames simultaneously.

(Frame Forwarding Portion)

The frame forwarding portion 40 is realized by e.g. an integrated circuit such as an FPGA (Field Programmable Gate Array) or an ASIC (Application Specific Integrated Circuit). The frame forwarding portion 40 forwards frames by referring to the FDB 42a and the LAG table 42b. In other words, the frame forwarding portion 40 forwards the frames received by the ports 38, based on a destination address in each of the frames, to the ports 38 to which the frames are to be transmitted. Also, the frame forwarding portion 40 creates and updates the FDB 42a based on a source address information in the frame. The FDB 42a mutually associates and registers a source address information in the frame received by the port 38, and a port number of the received port 38.

In the first embodiment, in order to create and update the LAG table 42b, the upper switch 32a further includes a LAG configuring portion 46, and, an identification information specifying portion 48, and further includes an identification information table 42c in the memory portion 42. As the preferred embodiment, the lower switch 34 transmits to the upper switch 32 an identification information notification frames (ID frame) 50 that are used to configure the LAG table 42b.

(Identification Information Notification Frame (Second Notification Frame))

Figures 3, 4:
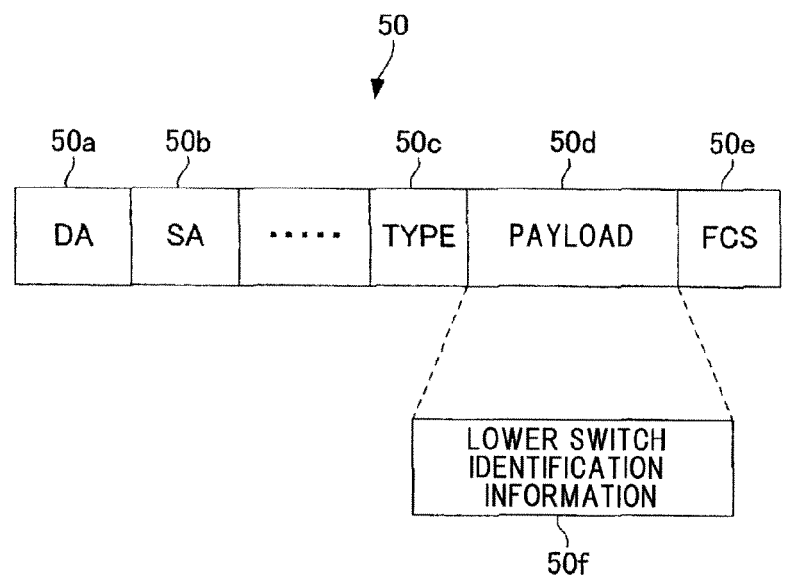
FIG. 3 is a diagram showing a format of an identification information notification frame in FIG. 2.
FIG. 4 is a table showing identification information table contents of the upper switch in FIG. 2.

The identification information notification frame 50 is a frame to be transmitted in order for the lower switch 34 to notify an identification information on the lower switch 34 to the upper switches 32 connected to the lower switch 34. FIG. 3 schematically illustrates a format of the identification information notification frame 50 transmitted by the lower switch 34. The identification information notification frame 50 includes a plurality of fields, and specifically includes a DA (destination address) field 50a, an SA (source address) field 50b, a TYPE field 50c, a payload field 50d, and an FCS field 50e.

The DA field 50a stores a multicast address having e.g. a forwarding range for the upper switch 32. The SA field 50b stores a MAC (Media Access Control) address assigned to the lower switch 34 of the source. The TYPE field 50c stores an identifier indicating that the frame is the identification information notification frame 50. The FCS field 50e stores a checksum code.

Also, the payload field 50d stores data, and in the first embodiment, stores a lower switch identifying information (identification information) 50f assigned to each of the lower switches 34 that are the sources of the identification information notification frames 50. The lower switch identification information 50f is information for identifying the lower switch 34, such as MAC address, IP (Internet Protocol) address and the like that are assigned to the lower switch 34.

(Identification Information Specifying Portion)

The identification information notification frames 50 are received by the ports 38, and forwarded via the frame forwarding portion 40, to the identification information specifying portion 48. The identification information specifying portion 48 reads the lower switch identification information 50f contained in each of the identification information notification frames 50, creates and updates the identification information table 42c based on the read lower switch identification information 50f.

(Identification Information Table)

FIG. 4 is a table showing the contents of the identification information table 42c. The identification information table 42c mutually associates and registers the port number of the port 38 having received the identification information notification frame 50, and the lower switch identification information 50f. Incidentally, in FIG. 4, as the port numbers of the ports 38, respective reference numerals of the ports 38 are used. Also, as the lower switch identification information 50f, respective reference numerals of the lower switches 34 are used.

(LAG Configuring Portion)

The LAG configuring portion 46 creates and updates the LAG table 42b, based on the information registered in the identification information table 42c. The LAG configuring portion 46 creates and updates the LAG table 42b, so that the LAG is configured for the ports 38 connected to the same lower switch 34.

(LAG Table)

Figures 5, 6:
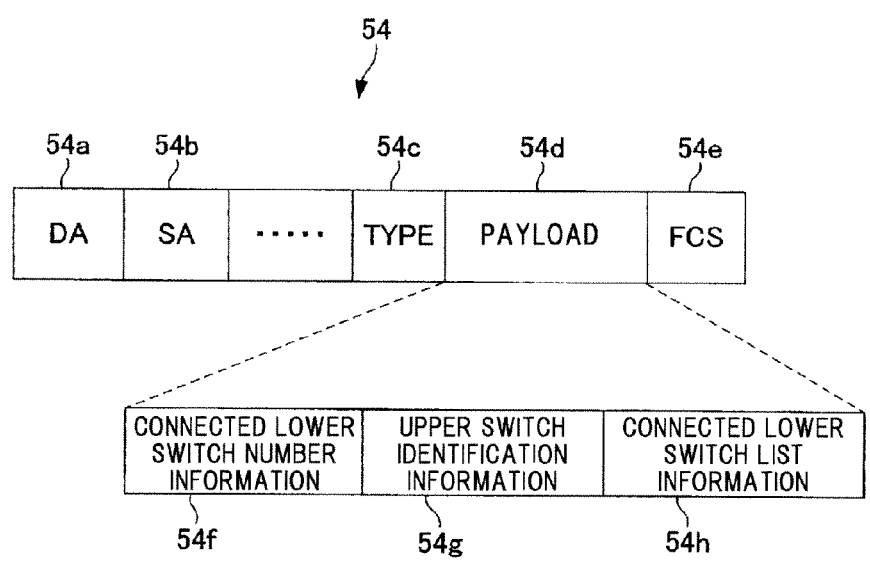
FIG. 5 is a table showing LAG table contents in FIG. 2.
FIG. 6 is a diagram showing a format of a connection information notification frame in FIG. 2.

FIG. 5 is a table showing the contents of the LAG table 42b. The LAG table 42b mutually associates and registers the port number of the port 38 and a LAG identification information (LAGID). Specifically, for the ports 38a, 38b, the LAG 52a is configured. For the ports 38c, 38d, the LAG 52b is configured.

Similarly, in the upper switches 32b, 32c, LAGs are configured. The LAGs configured in the upper switches 32b, 32c are provided with reference numerals 52c, 52d, 52e, 52f. Herein, "LAGs 52a, 52b, 52c, 52d, 52e, 52f" are also referred to collectively as "LAG 52." Incidentally, in FIG. 5, reference numerals are shown as identification information on the LAGs 52.

The LAG 52a bundles the ports 38a, 38b connected to the lower switch 34a logically as one port. Incidentally, the LAG 52b bundles the ports 38c, 38d connected to the lower switch 34b logically as one port.

When transmitting the user frame to the lower switch 34a, the frame forwarding portion 40 refers to the LAG table 42b, and transmits it from any one of the ports 38a, 38b belonging to the LAG 52a. Similarly, when transmitting the user frame to the lower switch 34b, the frame forwarding portion 40 transmits it from any one of the ports 38c, 38d belonging to the LAG 52b. Incidentally, the LAG 52 may contain one or more ports 38.

In the first embodiment, the upper switch 32a further includes a connection information notification frame generating portion 56. The connection information notification frame generating portion 56 generates a connection information notification frame (CI frame) 54, based on the lower switch identification information 50f registered in the identification information table 42c.

(Connection Information Notification Frame (First Notification Frame))

The connection information notification frame 54 is a frame to be transmitted in order for the upper switch 32 to notify a connected lower switch number information 54f on the number of lower switches 34 connected to the upper switch 32 to the lower switches 34 connected to the upper switch 32. FIG. 6 shows a format of the connection information notification frames 54. The connection information notification frame 54 contains a DA field 54a, an SA field 54b, a TYPE field 54c, a payload field 54d, and, an FCS field 54e.

The DA field 54a stores a multicast address having e.g. a forwarding range for the lower switches 34, and the SA field 54b stores a MAC (Media Access Control) address assigned to the upper switch 32 of the source. The TYPE field 54c stores an identifier indicating that the frame is the connection information notification frame 54. The FCS field 54e stores a checksum code.

The payload field 54d stores at least the connected lower switch number information 54f. Further, in the first embodiment, as a preferred embodiment, the payload field 54d contains an upper switch identification information 54g, and a connected lower switch list information 54h as the list information. The upper switch identifying information (identification information) 54g is an identification information on the upper switch 32 which is the source of the connection information notification frame 54, such as MAC address, IP address, and the like. Also, the connected lower switch list information 54h contained in the payload field 54d is a list of the lower switch identification information 50f registered in the identification information table 42c. Therefore, the connected lower switch list information 54h includes the lower switch identification information 50f on one or more lower switches 34.

The connected lower switch number information 54f is an information indicating the number of lower switches 34 connected to the upper switch 32 via the network cable 44. The number of connected lower switches is determined by the connection information notification frame generating portion 56, based on the lower switch identification information 50f registered in the identification information table 42c. Specifically, the connection information notification frame generating portion 56 determines the number of mutually different lower switch identification information 50f as the number of connected lower switches.

Incidentally, the connection information notification frame generating portion 56 sets the connected lower switch number information 54f of the connection information notification frame 54 to "0", in an initial stage before the lower switch identification information 50f is registered in the identification information table 42c.

When the connection information notification frame 54 is generated by the connection information notification frame generating portion 56, the frame forwarding portion 40 transmits the generated connection information notification frame 54 from the ports 38 to all the connected lower switches 34 simultaneously. Therefore, the connection information notification frame 54 is transmitted from the ports 38 of the upper switch 32 to the lower switches 34a, 34b.

(Lower Switch)

Figure 7:
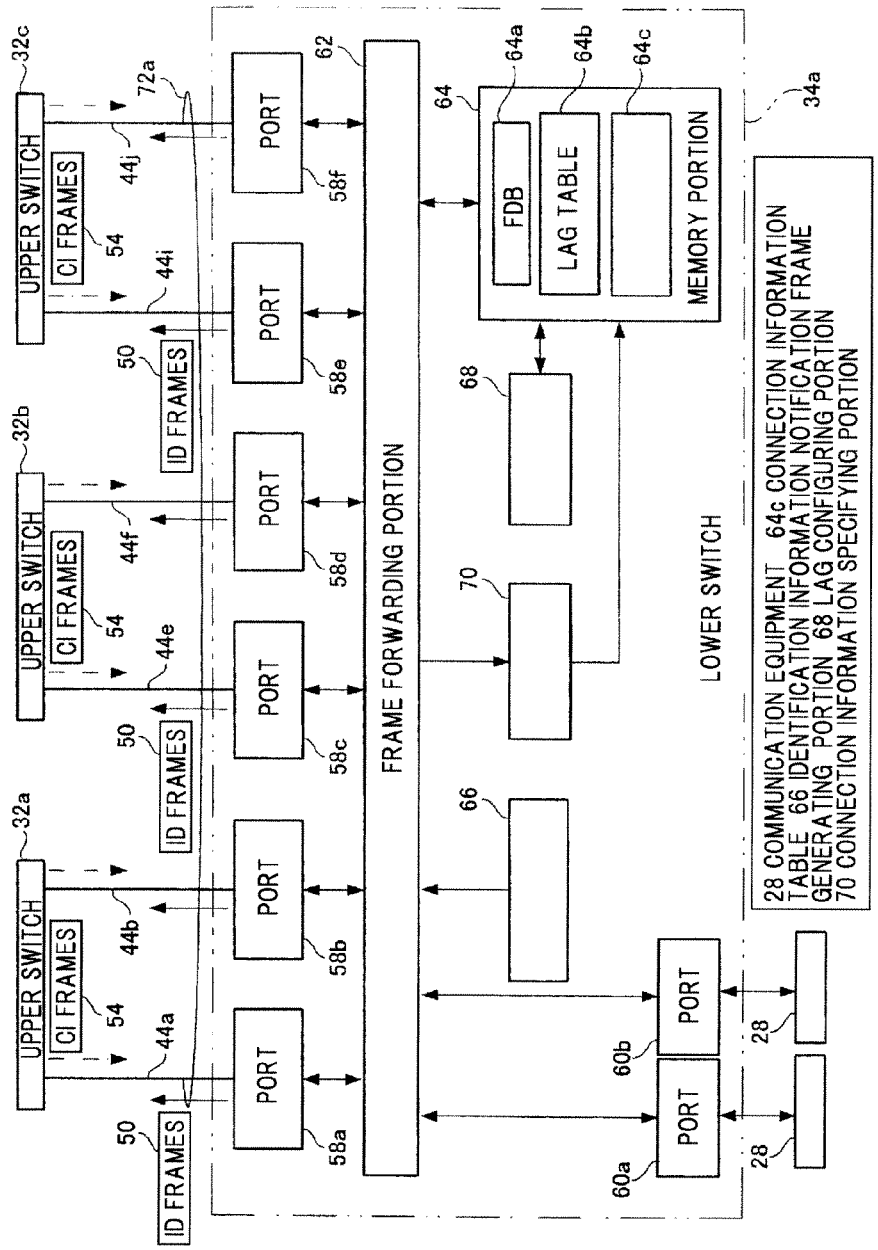
FIG. 7 is a block diagram schematically showing a functional configuration of a lower switch in FIG. 1.

FIG. 7 is a block diagram schematically showing a functional configuration of the lower switch 34a. Incidentally, the configuration of the lower switch 34b is the same as that of the lower switch 34a, and the description thereof is omitted.

The lower switch 34a has the plural ports 58a, 58b, 58c, 58d, 58e, 58f, 60a, 60b, a frame forwarding portion 62, and a memory portion 64. The memory portion 64 is formed of e.g. a RAM, and stores a FDB 64a, and a LAG table 64b.

(Port)

The ports 58a, 58b, 58c, 58d, 58e, 58f are connected to the upper switches 32. In the lower switch 34, the ports 58a, 58b are connected to the upper switch 32a through the network cables 44a, 44b. The ports 58c, 58d are connected to the upper switch 32b via the network cables 44e, 44f. And, the ports 58e, 58f are connected to the upper switch 32c via the network cables 44i, 44j. The ports 60a, 60b are connected to the communication equipments 28.

Herein, the "ports 58a, 58b, 58c, 58d, 58e, 58f" are also referred to collectively as "port 58" and the "ports 60a, 60b" are also referred to collectively as "port 60." The number of ports 58 and 60 is not limited to the illustrated number. Also, each of the ports 58 is compatible with full-duplex communication.

The frame forwarding portion 62 is realized by e.g. an integrated circuit such as ASIC or FPGA. By referring to the FDB 64a and the LAG table 64b, the frame forwarding portion 62 forwards a frame received by the port 58 or 60, based on a destination address in the frame, to the port 58 or 60 to which the frame is to be transmitted.

Also, the frame forwarding portion 62 creates and updates the FDB 64a based on source address information in the frame. The FDB 64a mutually associates and registers the source address information in the frame received by the port 58 or 60, and the port number of received port 58 or 60.

In the first embodiment, as a preferred embodiment, the lower switch 34a further includes an identification information notification frame generating portion 66. The identification information notification frame generating portion 66 generates the identification information notification frame (ID frame) 50. As mentioned above, the identification information notification frame 50 contains the lower switch identification information 50f on the lower switch 34 of the source in the payload field 50d.

When the identification information notification frame 50 is generated by the identification information notification frame generating portion 66, the frame forwarding portion 62 transmits the identification information notification frame 50 from the respective ports 58 simultaneously to all the upper switches 32 connected to the lower switch 34a. The identification information notification frames 50 transmitted from the respective ports 58 are received by the upper switches 32 through the network cables 44.

Also, in the first embodiment, in order to create and update the LAG table 64b, the lower switch 34a further includes a LAG configuring portion 68, and, a connection information specifying portion 70, and the memory portion 64 further includes a connection information table 64c.

(Connection Information Specifying Portion)

The connection information notification frame (CI frame) 54 transmitted from the upper switch 32 is received by the port 58, and forwarded by the frame forwarding portion 62, to the connection information specifying portion 70. The connection information specifying portion 70 reads the connected lower switch number information 54f contained in the received connection information notification frame 54, creates and updates the connection information table 64c based on the read connected lower switch number information 54f.

(Connection Information Table)

Figure 8:
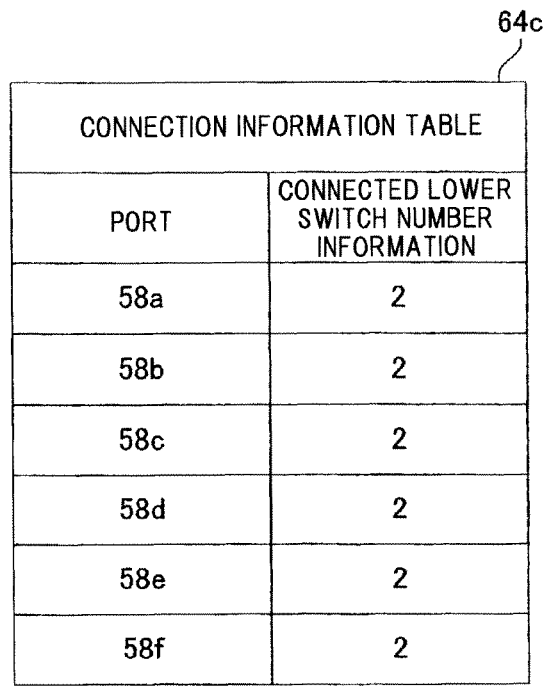
FIG. 8 is a table showing connection information table contents in FIG. 7.

FIG. 8 is a table showing the contents of the connection information table 64c. The connection information table 64c mutually associates and registers the port 58 having received the connection information notification frame 54 and the connected lower switch number information 54f.

(LAG Configuring Portion)

The LAG configuring portion 68 creates and updates the LAG table 64b, based on the information registered in the connection information table 64c. Specifically, the LAG configuring portion 68 first finds a maximum value from among the connected lower switch number information 54f registered in the connection information table 64c. And, the LAG configuring portion 68 creates and updates the LAG table 64b, to configure a LAG for the ports 58 associated with the maximum value in the connection information table 64c.

In the first embodiment, in the connection information table 64c shown in FIG. 8, the maximum value of the connected lower switch number information 54f is "2," and in association with this maximum value, the LAG configuring portion 68 creates and updates the LAG table 64b, to configure the LAG for these ports 58a, 58b, 58c, 58d, 58e, 58f.

(LAG Table)

Figure 9:
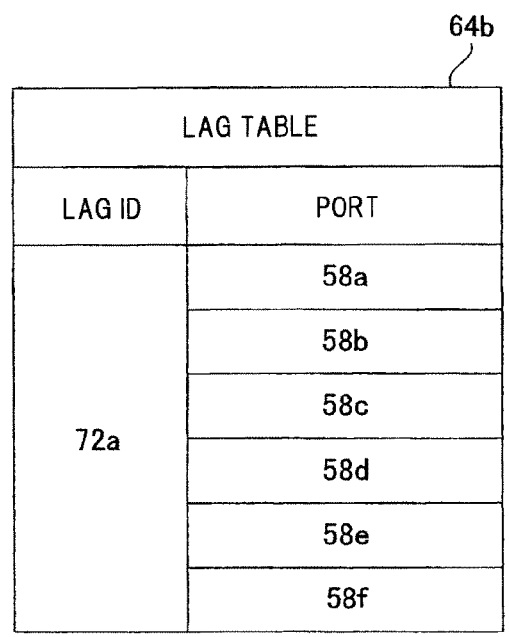
FIG. 9 is a table showing LAG table contents in FIG. 7.

FIG. 9 is a table showing the contents of the LAG table 64b. The LAG table 64b mutually associates and registers the port number of the port 58 and the LAG identification information (LAGID). Specifically, in the LAG table 64b, for the ports 58a, 58b, 58c, 58d, 58e, 58f, the LAG 72a is configured. Incidentally, in FIG. 9, the reference numeral is shown as the LAG identification information. Similarly, in the lower switch 34b, a LAG is configured. The LAG configured in the lower switch 34b is provided with a character 72b. Herein, the "LAGS 72a, 72b" are also referred to collectively as "LAG 72."

When transmitting the user frame to the upper switches 32, the frame forwarding portion 62 transmits the user frame from any one of the ports 58 belonging to the LAG 72. Incidentally, the port(s) 58 not belonging to the LAG 72, as well as the ports 58 belonging to the LAG 72, are used for transmission of the identification information notification frames 50 and reception of the connection information notification frames 54.

Next, operation of the network system 10 in the first embodiment will be described below.

(Operation Example 1)

Figure 10:
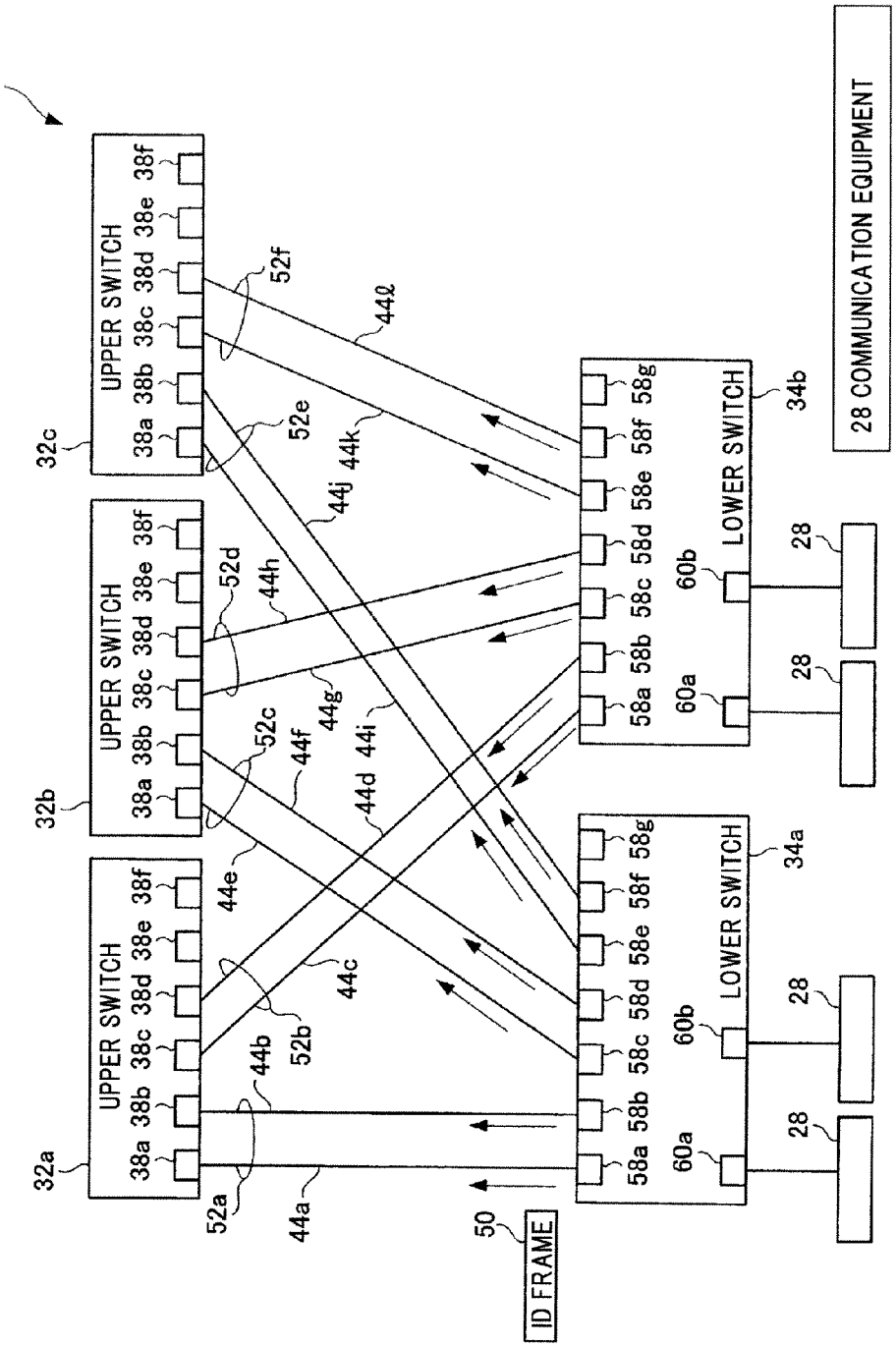
FIG. 10 is a diagram for explaining an operation example 1 of the network system in the first embodiment.

FIG. 10 is a diagram for explaining the operation example 1 of the network system in the first embodiment. The network system 10 comprises two lower switches 34 and three upper switches 32, and each of the lower switches 34 is connected to all the upper switches 32. For example, after a network administrator builds a network system 10 shown in FIG. 10, and by activating the upper switches 32 and the lower switches 34, the network system 10 starts the following operations.

As shown in FIG. 10, the lower switch 34a generates the identification information notification frame 50 including the lower switch identification information 50f on the lower switch 34a. Similarly, the lower switch 34b generates the identification information notification frame 50 including the lower switch identification information 50f on the lower switch 34b.

Then, the lower switches 34a, 34b transmit the identification information notification frames 50 from all the ports 58a, 58b, 58c, 58d, 58e, 58f, to the upper switches 32a, 32b, 32c connected to the lower switches 34a, 34b. The transmitted identification information notification frames 50 are received by the ports 38 of the upper switch 32. Incidentally, the identification information notification frames 50 are repeatedly transmitted at regular or irregular intervals.

On receiving the identification information notification frames 50, the upper switch 32 creates the identification information table 42c with the identification information specifying portion 48, based on the lower switch identification information 50f in each of the identification information notification frames 50. As shown in FIG. 4, the upper switch 32 associates and registers the ports 38a, 38b and the lower switch identification information 50f on the lower switch 34a in the identification information table 42c, and associates and registers the ports 38c, 38d and the lower switch identification information 50f on the lower switch 34b in the identification information table 42c.

Next, the LAG configuring portion 46 of the upper switch 32 creates the LAG table 42b based on the created identification information table 42c. Specifically, the LAG configuring portion 46 of the upper switch 32 creates the LAG table 42b to configure the LAG for the ports 38 connected to the same lower switch 34. As a result, the LAG 52 is configured.

Figure 11:
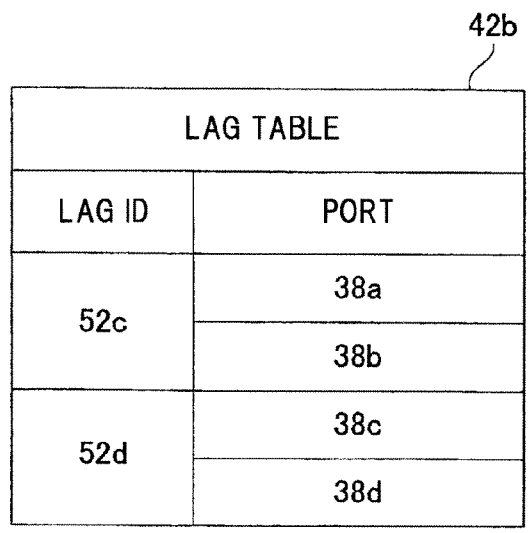
FIG. 11 is a table showing LAG table contents registered in an upper switch in FIG. 10.
Figure 12:
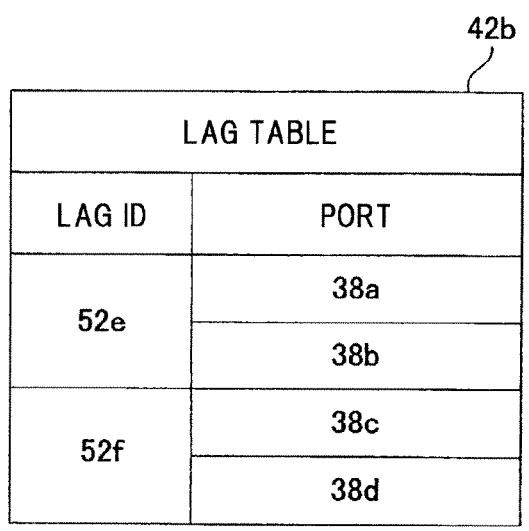
FIG. 12 is a table showing LAG table contents registered in an upper switch in FIG. 10.

As a result, as shown in FIG. 5, in the LAG table 42b of the upper switch 32a, the LAG 52a is configured for the ports 38a, 38b, and the LAG 52b is configured for the ports 38c, 38d. As shown in FIG. 11, in the LAG table 42b of the upper switch 32b, the LAG 52c is configured for the ports 38a, 38b, and the LAG 52d is configured for the ports 38c, 38d. As shown in FIG. 12, in the LAG table 42b of the upper switch 32c, the LAG 52e is configured for the ports 38a, 38b, and the LAG 52f is configured for the ports 38c, 38d.

Figure 13:
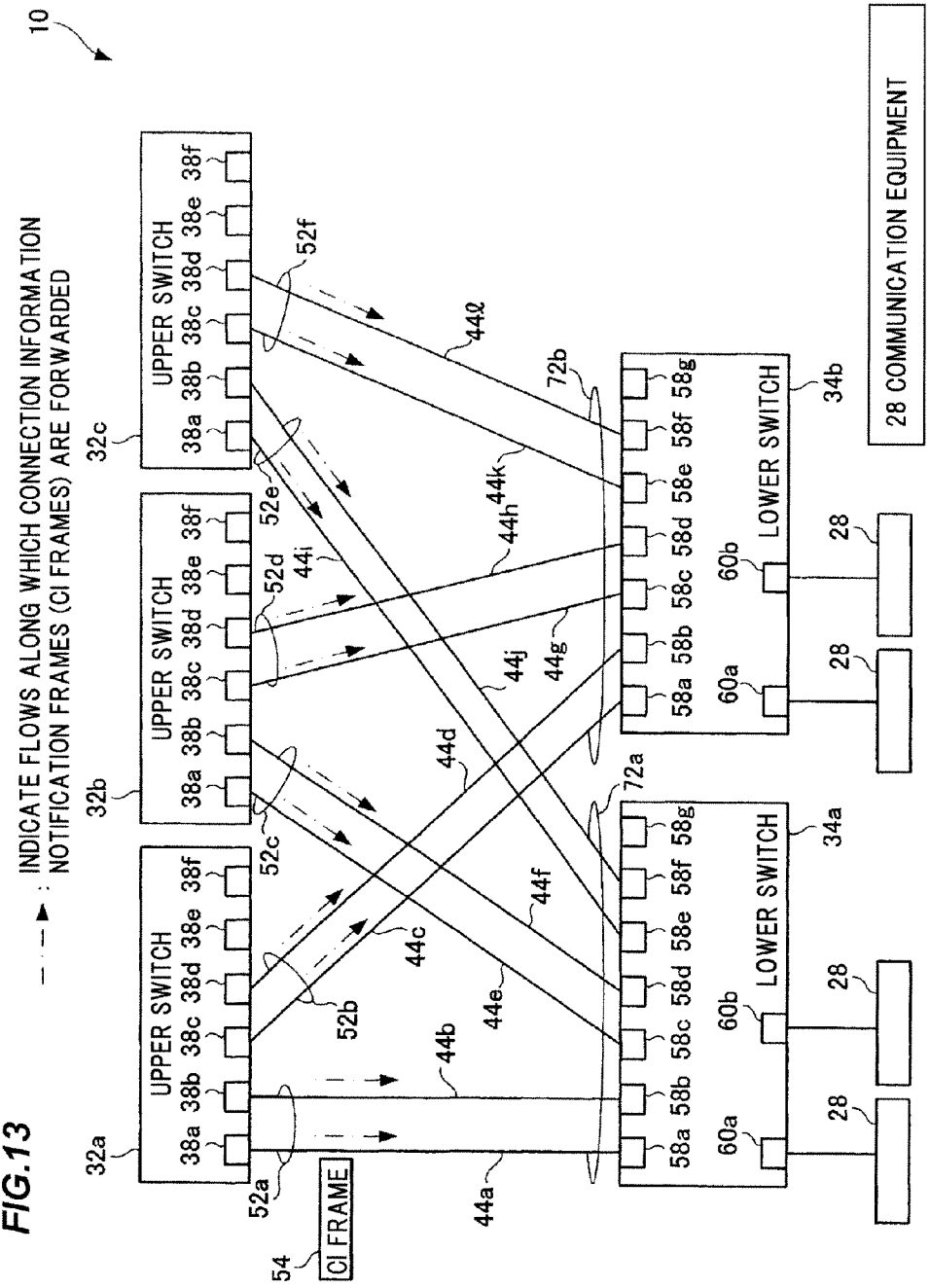
FIG. 13 is a diagram for explaining the operation example 1 of the network system in the first embodiment.

The upper switch 32 generates the connection information notification frame 54, based on the lower switch identification information 50f registered in the identification information table 42c. As shown in FIG. 13, the upper switch 32 transmits the generated connection information notification frames 54 (i.e. arrows indicated by broken lines) to the lower switches 34 through the ports 38.

Specifically, as shown in FIG. 4, in the identification information table 42c of the upper switch 32, the lower switch identification information 50f on the lower switches 34a, 34b are registered. Therefore, the upper switch 32 generates and transmits the connection information notification frame 54 containing "2" in the connected lower switch number information 54f. Incidentally, the connection information notification frames 54 are repeatedly transmitted at regular or irregular intervals.

On receiving the connection information notification frames 54, the lower switch 34 creates, with the connection information specifying portion 70, the connection information table 64c having associated therein the connected lower switch number information 54f contained in each of the connection information notification frames 54 and the port numbers of the ports 58 having received the connection information notification frames 54. In this operation example, as with the connection information table 64c shown in FIG. 8, the connection information table 64c of each lower switch 34 registers the "2" in association with each of the ports 58a, 58b, 58c, 58d, 58e, 58f, as the connected lower switch number information 54f.

Next, the LAG configuring portion 68 of the lower switch 34 finds the maximum value from among the connected lower switch number information 54f registered in the connection information table 64c. In this operation example, the maximum value is "2." Then, the LAG configuring portion 68 of the lower switch 34 creates and updates the LAG table 64b, to configure a LAG for the ports 58 associated with the maximum value. In this operation example, for the ports 58a, 58b, 58c, 58d, 58e, 58f of the lower switch 34a, the LAG 72a is configured, and similarly, for the ports 58a, 58b, 58c, 58d, 58e, 58f of the lower switch 34b, the LAG 72b is configured.

In accordance with the above operation example, by building the network system 10 as shown in FIG. 10, in the lower switches 34a, 34b, the LAGs 72a, 72b are configured for the ports 58a, 58b, 58c, 58d, 58e, 58f connected to the upper switches 32a, 32b, 32c. According to this structure, the lower switches 34a, 34b can transmit or receive the user frames via the upper switches 32a, 32b, 32c.

(Operation Example 2)

Figure 14:
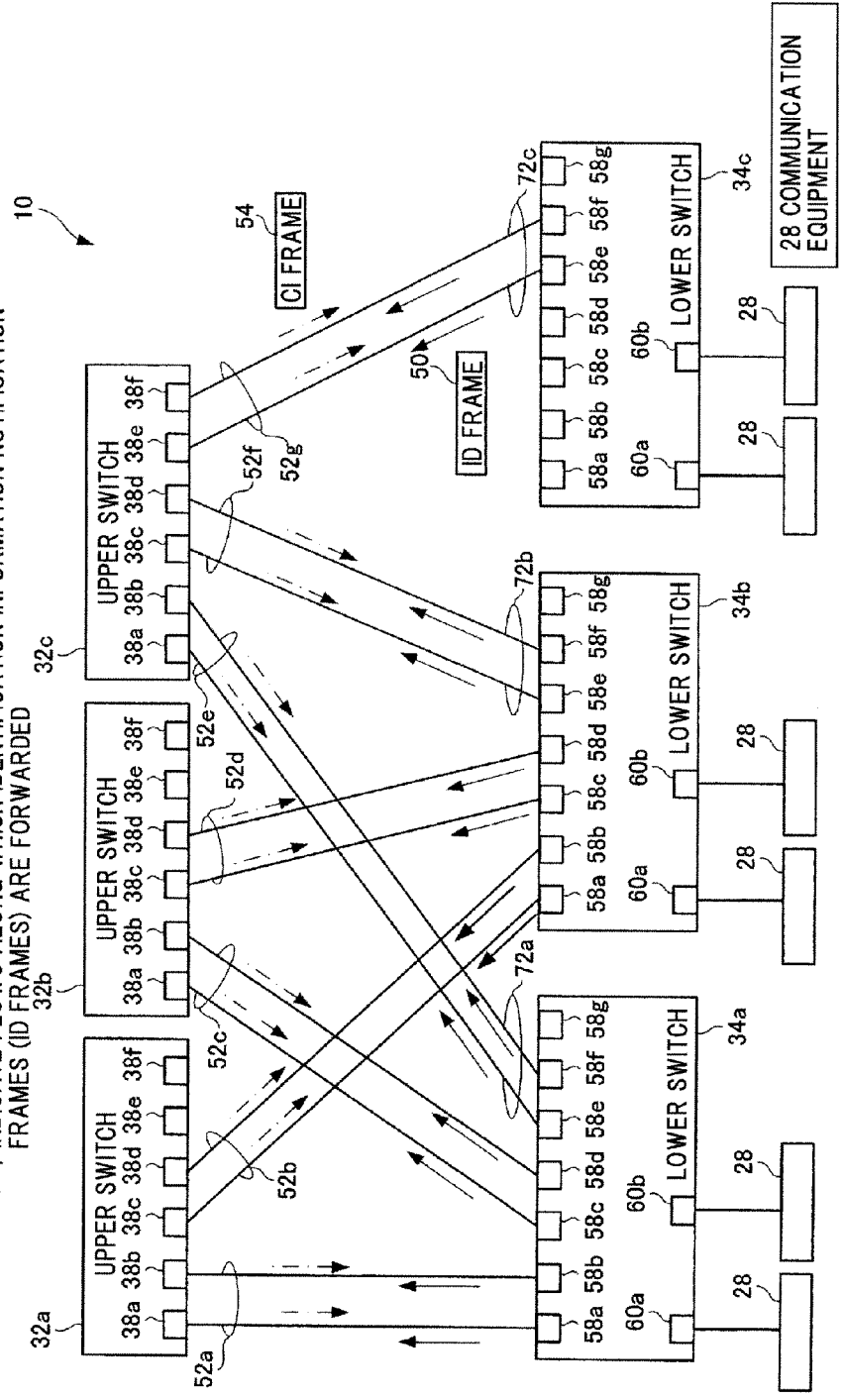
FIG. 14 is a diagram for explaining an operation example 2 of the network system in the first embodiment.

FIG. 14 is a diagram for explaining the operation example 2 of the network system in the first embodiment. The network system 10 shown in FIG. 14 is the network system 10 shown in FIG. 1 with a lower switch 34c added therein. The ports 58e, 58f of the lower switch 34c are connected to the ports 38e, 38f, respectively, of the upper switch 32c.

The lower switches 34a, 34b transmit the identification information notification frames 50 to the upper switches 32a, 32b, 32c. Also, the newly added lower switch 34c transmits the identification information notification frame to the upper switch 32c.

Figure 15:
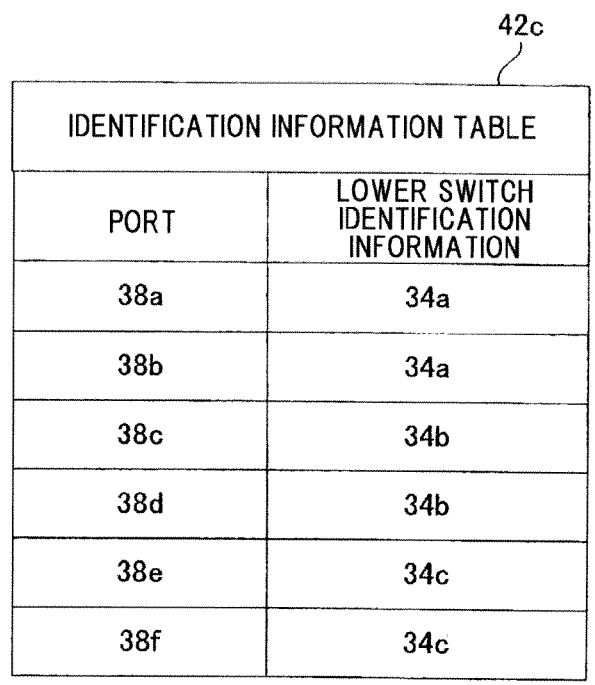
FIG. 15 is a table showing identification information table contents registered in the upper switch in FIG. 14.

Each of the upper switches 32a, 32b, 32c updates the contents of the identification information table 42c based on the received identification information notification frames 50. It should be noted, however, that each of the upper switches 32a, 32b does not alter the contents of the identification information table 42c, and the contents of the identification information table 42c after updating are the same as the contents of the identification information table 42c shown in FIG. 4. The upper switch 32c associates and additionally registers the lower switch identification information 50f on the added lower switch 34c and the ports 38e, 38f in the identification information table 42c, as in the identification information table 42c shown in FIG. 15.

Next, each of the upper switches 32a, 32b, 32c updates the contents of the LAG table 42b. Because each of the upper switches 32a, 32b does not alter the contents of the identification information table 42c, the contents of the LAG table 42b after the updating are the same as the contents of the LAG table 42b shown in FIG. 5. The LAG table 42b of the upper switch 32c additionally registers the ports 38e, 38f, and configures a LAG 52g for the ports 38e, 38f.

Each of the upper switches 32a, 32b, 32c refers to the contents of the identification information table 42c after the updating, and generates the connection information notification frame 54. Here, the number of lower switches 34 connected to each of the upper switch 32a, 32b is two, and the number of lower switches 34 connected to the upper switch 32c is three. Each of the upper switches 32a, 32b generates the connection information notification frame 54 containing the "2" as the connected lower switch number information 54f. Also, the upper switch 32c generates the connection information notification frame 54 containing the "3" as the connected lower switch number information 54f.

Each of the upper switches 32a, 32b transmits the generated connection information notification frames 54 to the lower switches 34a, 34b. The upper switch 32c transmits the generated connection information notification frames 54 to the lower switches 34a, 34b, 34c.

Based on the received connection information notification frame 54, the lower switch 34, in turn, updates the connection information table 64c and the LAG table 64b, and reconfigures the LAG 72.

Figure 16:
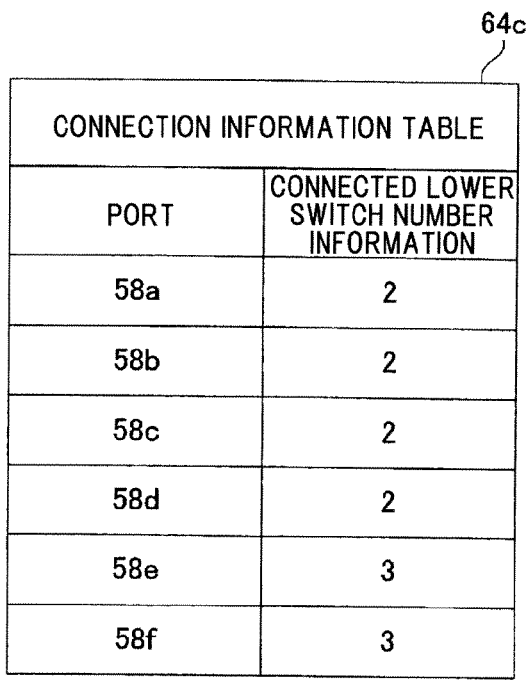
FIG. 16 is a table showing updated connection information table contents registered in a lower switch in FIG. 14.

FIG. 16 shows the updated contents of the connection information table 64c in each of the lower switches 34a, 34b. The connection information table 64c of each of the lower switches 34a, 34b after the updating registers the "2" in association with the ports 58a, 58b, 58c, 58d, as the connected lower switch number information 54f, and registers the "3" in association with the ports 58e, 58f, as the connected lower switch number information 54f.

Figure 17:
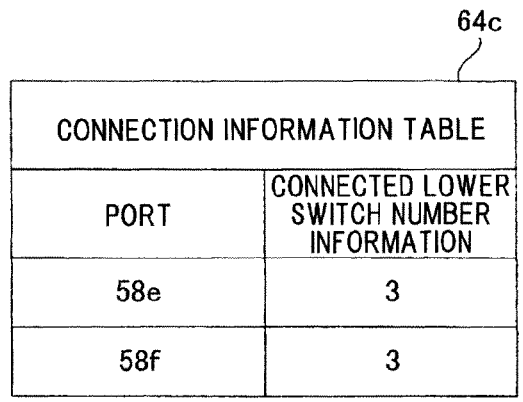
FIG. 17 is a table showing connection information table contents registered in an added lower switch in FIG. 14.

FIG. 17 shows the contents of the connection information table 64c created in the newly added lower switch 34c. The connection information table 64c of the lower switch 34c registers the "3" in association with the ports 58e, 58f as the connected lower switch number information 54f.

Figure 18:
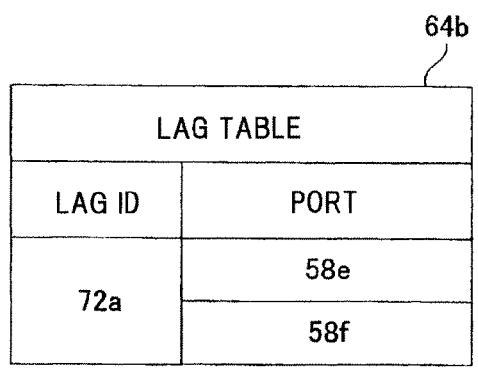
FIG. 18 is a table showing updated LAG table contents registered in a lower switch in FIG. 14.
Figure 19:
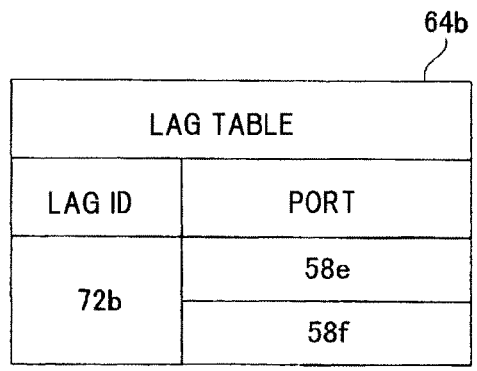
FIG. 19 is a table showing updated LAG table contents registered in a lower switch in FIG. 14.
Figure 20:
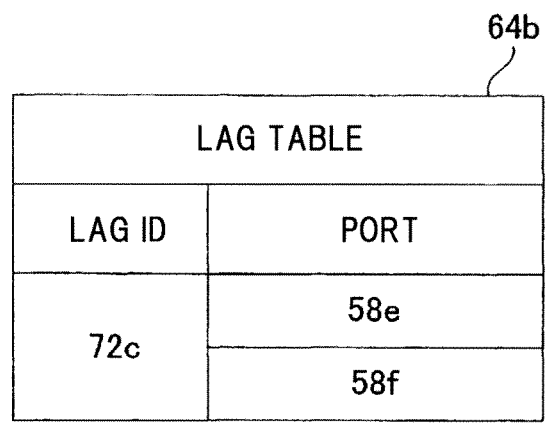
FIG. 20 is a table showing updated LAG table contents registered in an added lower switch in FIG. 14.

Next, the LAG configuring portion 68 of each of the lower switches 34a, 34b refers to the connection information table 64c of FIG. 16, finds the "3" as a maximum value, and configures LAGs 72a, 72b for the ports 58e, 58f associated with the "3," as in the LAG table 64b shown in FIGS. 18 and 19. Similarly, the LAG configuring portion 68 of the lower switch 34c refers to the connection information table 64c of FIG. 17, finds the "3" as the maximum value, and configures a LAG 72c for the ports 58e, 58f associated with the "3," as in the LAG table 64b shown in FIG. 20.

In accordance with the above operation example, by adding the lower switch 34c as shown in FIG. 14, the upper switches 32a, 32b are excluded from the LAGs 72a, 72b of the lower switches 34a, 34b. On the other hand, in the lower switch 34c, the LAG 72c is configured for the ports 58e, 58f connected to the upper switch 32c. According to this structure, the lower switches 34a, 34b, 34c can transmit or receive the user frames via the upper switch 32c. No user frame is forwarded to the upper switches 32a, 32b that are not connected to the lower switch 34c.

(Operation Example 3)

Figure 21:
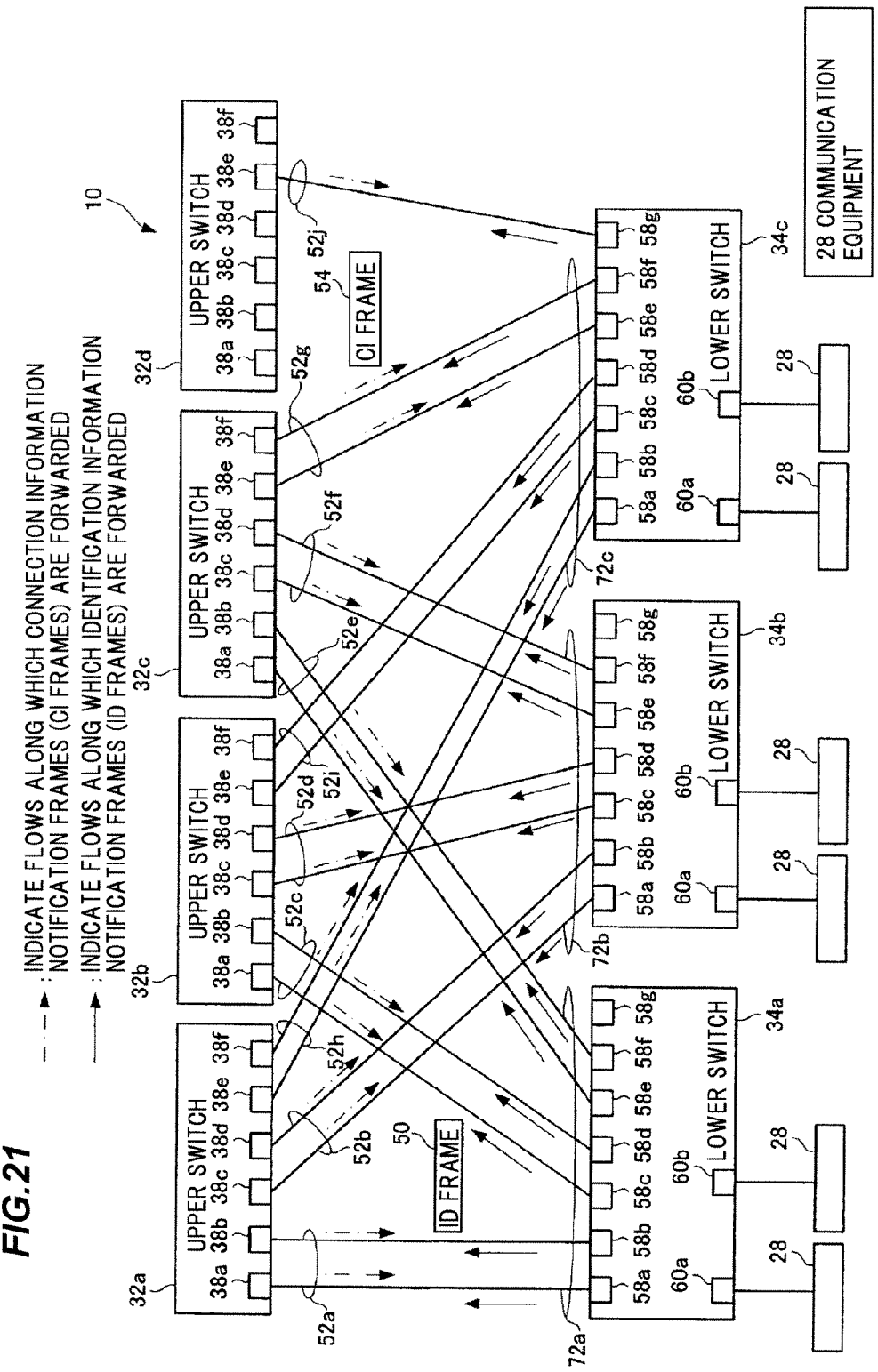
FIG. 21 is a diagram for explaining an operation example 3 of the network system in the first embodiment.

FIG. 21 is a diagram for explaining the operation example 3 of the network system in the first embodiment. The network system 10 shown in FIG. 21 is the network system 10 shown in FIG. 1 with the lower switch 34c added therein and with a further upper switch 32d thereafter added therein. Herein is explained the example of connecting the lower switch 34c to the upper switches 32a, 32b, 32c, and then connecting and adding the upper switch 32d to the lower switch 34c. In the lower switch 34c, the ports 58a, 58b are connected to the ports 38e, 38f of the upper switch 32a, and the ports 58c, 58d are connected to the ports 38e, 38f of the upper switch 32b, and the port 58e, 58f are connected to the ports 38e, 38f of the upper switch 32c. In the upper switch 32d, the port 38e is connected to the port 58g of the lower switch 34c.

Each of the lower switches 34a, 34b transmits the identification information notification frames 50 to the upper switches 32a, 32b, 32c. Also, the lower switch 34c transmits the identification information notification frames 50 to the upper switches 32a, 32b, 32c, 32d.

On receiving the identification information notification frames 50 from the lower switches 34a, 34b, 34c, each of the upper switches 32a, 32b, 32c associates and additionally registers the lower switch identification information 50f on the lower switch 34c and the port numbers of the ports 38e, 38f, in the identification information table 42c. Also, the newly added upper switch 32d associates and newly registers the lower switch identification information 50f on the lower switch 34c, and the port 38e, in the identification information table 42c.

Then, in addition to the LAGs 52a, 52b, the upper switch 32a further configures a LAG 52h for the ports 38e, 38f, in the LAG table 42b. Similarly, in addition to the LAGs 52c, 52d, the upper switch 32b further configures a LAG 52i for the ports 38e, 38f, in the LAG table 42b. The upper switch 32c configures, in the LAG table 42b, the LAG 52e for the ports 38a, 38b, and the LAG 52f for the ports 38c, 38d. Also, the upper switch 32c configures the LAG 52g for the ports 38e, 38f. The newly added upper switch 32d configures, in the LAG table 42b, a LAG 52j for the port 38e having received the lower switch identification information 50f on the lower switch 34c.

Then, based on the contents registered in the identification information table 42c, each of the upper switches 32a, 32b, 32c transmits to the lower switches 34a, 34b, 34c the connection information notification frames 54 containing the "3" as the connected lower switch number information 54f. Also, the upper switch 32d transmits to the lower switch 34c the connection information notification frames 54 each of which contains the "1" as the connected lower switch number information 54f.

The lower switches 34a, 34b receive the "3" as the connected lower switch number information 54f, from all the upper switches 32a, 32b, 32c connected to the lower switches 34a, 34b. Therefore, the lower switch 34a configures, in the LAG table 64b, the LAG 72a for the ports 58a, 58b, 58c, 58d, 58e, 58f. Also, the lower switch 34b configures, in the LAG table 64b, the LAG 72b for the ports 58a, 58b, 58c, 58d, 58e, 58f.

The lower switch 34c receives the "3" from the upper switches 32a, 32b, 32c as the connected lower switch number information 54f, and receives the "1" from the upper switch 32d as the connected lower switch number information 54f. The lower switch 34c configures, in the LAG table 64b, the LAG72c for the ports 58a, 58b, 58c, 58d, 58e, 58f having received the "3" as the connected lower switch number information 54f. Incidentally, the lower switch 34c does not configure the LAG72c, for the port 58g having received the "1" as the connected lower switch number information 54f.

In accordance with the above operation example, by adding the lower switch 34c and the upper switch 32d as shown in FIG. 21, in the lower switches 34a, 34b, 34c, the LAGs 72a, 72b, 72c are configured to include the ports 58 connected to the upper switches 32a, 32b, 32c, but exclude the ports 58 connected to the switch 32d. According to this structure, the lower switches 34a, 34b, 34c can transmit or receive the user frames via the upper switches 32a, 32b, 32c. No user frame is forwarded to the upper switch 32d that is not connected to the lower switches 34a, 34b.

The network system 10 in the first embodiment described above can automatically configure LAG(s) for the ports connected to the upper switches 32, of the plural ports of the lower switches 34.

Also, with the network system 10 of the first embodiment described above, the upper switch 32 transmits to the lower switches 34 the connection information notification frames 54 each of which contains the connected lower switch number information 54f, and the lower switch 34 operates to configure LAG(s) for the ports 58 having received the connection information notification frames 54 each of which contains the maximum connected lower switch number information 54f of the connected lower switch number information 54f contained in the connection information notification frames 54. According to this structure, the lower switch 34 can automatically configure LAG(s), for the ports 58 connected to the upper switches 32 connected to all the lower switches 34.

Also, with the network system 10 of the first embodiment described above, the lower switch 34 transmits to the upper switches 32 the identification information notification frames 50 each of which contains the lower switch identification information 50f, and the upper switch 32 operates to determine the number of lower switches 34 connected to the upper switch 32, based on the number in the lower switch identification information 50f contained in each of the identification information notification frames 50. According to this structure, the upper switch 32 can automatically determine the number of lower switches 34 connected to the upper switch 32.

Also, the upper switches 32 is operative to configure LAG(s) for the ports 38 having received the identification information notification frames 50 containing the same lower switch identification information 50f. According to this structure, the upper switch 32 can automatically configure LAG(s), for the ports 38 connected to the same lower switch 34 of the plural ports of the upper switches 32.

According to the network system 10 of the first embodiment described above, the upper switch 32 repeatedly transmits the connection information notification frames 54 at regular or irregular intervals. According to this structure, the lower switch 34 can automatically reconfigure the LAG 72, even in the event of alteration to the number of upper switches 32 and/or lower switches 34 or in the event of fault occurrence such as a wire break and the like, within the network system 10.

According to the network system 10 of the first embodiment described above, the lower switch 34 repeatedly transmits the identification information notification frames 50 at regular or irregular intervals. According to this structure, the upper switch 32 can automatically determine the number of connected lower switches 34, and reconfigure the LAG 52, even in the event of alteration to the number of upper switches 32 and/or lower switches 34 or in the event of fault occurrence such as a wire break and the like, within the network system 10.

Second Embodiment

Next, a second embodiment according to the invention will be explained below. Such a connection state is assumed that, due to a wiring connection error caused by the administrator during network system building, or a network cable fault, some of the upper switches are not connected to some of the lower switches. In this connection state, because some of the upper switches that are not connected to some of the lower switches are not used in user frame forwarding, bands of all the upper switches of the network system 10 are not effectively utilized.

Herein, such a connection state that some of the upper switches are not connected to some of the lower switches is defined as "incompletely connected state," while such a state that each of all the upper switches is connected to all the lower switches is defined as "completely connected state." Also, such a connection state is assumed that, due to a wiring connection error or a network cable fault, there is no upper switch connected to all the lower switches within a network system. This connection state results in a zone in which no user frame can be forwarded between some of the lower switches, for all the upper switches.

Herein, such a connection state that there is no upper switch connected to all the lower switches is defined as "communication disabled state," while such a connection state that there is one or more upper switches connected to all the lower switches is defined as "communication enabled state." The network system in the second embodiment is characterized by having a function for determining a completely connected state or an incompletely connected state, and a communication enabled state or a communication disabled state.

(Lower Switch)

Figure 22:
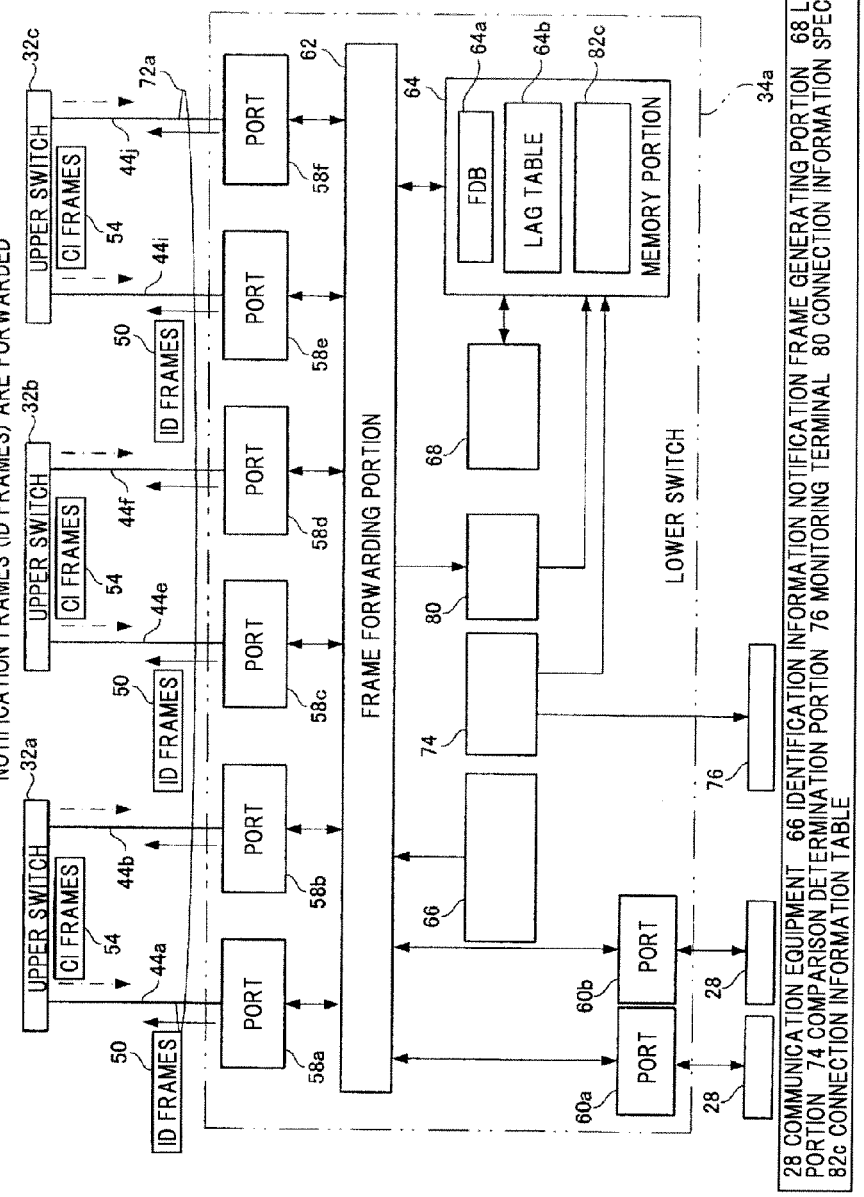
FIG. 22 is a block diagram showing a functional configuration of a lower switch in second embodiment.

FIG. 22 is a block diagram schematically showing a functional configuration of the lower switch 34a in the second embodiment. Incidentally, the same constituent elements as constituent elements included in the lower switch 34 in the first embodiment are provided with the same names or reference numerals, and description will be omitted or simplified.

A connection information specifying portion 80 of the lower switch 34a registers the connected lower switch list information 54h and the upper switch identification information 54g in a connection information table 82c, based on the connection information notification frame 54.

(Connection Information Table)

FIG. 23 shows the contents of the connection information table 82c created and updated in the lower switch 34a in the second embodiment. The connection information table 82c associates and registers the port numbers of the ports 58 having received the connection information notification frames 54, and the connected lower switch list information

54*h* and the upper switch identification information 54*g* contained in each of the connection information notification frames 54.

(Comparison Determination Portion)

The lower switch 34*a* further includes a comparison determination portion 74. The comparison determination portion 74 compares the connected lower switch list informations 54*h* notified by the upper switches 32. Incidentally, in this comparison, the connection information table 82*c* compares the connected lower switch list informations 54*h* registered in association with the different upper switches 32.

As a result of comparing the connected lower switch list information 54*h* registered in the connection information table 82*c*, when all the connected lower switch list informations 54*h* match each other, the comparison determination portion 74 determines that the network system 10 is in the completely connected state. On the other hand, when there is a mismatch between the registered connected lower switch list informations 54*h*, the comparison determination portion 74 determines that the network system 10 is in the incompletely connected state.

Also, the comparison determination portion 74 extracts all the lower switch identification informations 50*f* contained in the connected lower switch list informations 54*h* in the connection information table 82*c*. Next, the comparison determination portion 74 determines whether or not at least one of the connected lower switch list informations 54*h* registered in the connection information table 82*c* contains all the extracted lower switch identification informations 50*f*.

If even one connected lower switch list information 54*h* containing all the extracted lower switch identification informations 50*f* is being registered in the connection information table 82*c*, the comparison determination portion 74 determines that the network system 10 is in the communication enabled state. On the other hand, if even one connected lower switch list information 54*h* containing all the extracted lower switch identification informations 50*f* is being not registered in the connection information table 82*c*, the comparison determination portion 74 determines that the network system 10 is in the communication disabled state.

And, in the second embodiment, as a preferred embodiment, the comparison determination portion 74 notifies a determined result to a monitoring terminal 76. As a method to notify the determined result to the monitoring terminal 76, an SNMP (Simple Network Management Protocol) trap function for example can be used. The determined result notified is output to a monitor of the monitoring terminal 76, so that administrator can take necessary action such as additional wiring and the like based on the determined result output to the monitor. Incidentally, the comparison determination portion 74 may notify or not notify that effect to the monitoring terminal 76, in the event of being unable to make a determination.

(Operation Example 1: A Case of the Completely Connected State)

Figure 24:
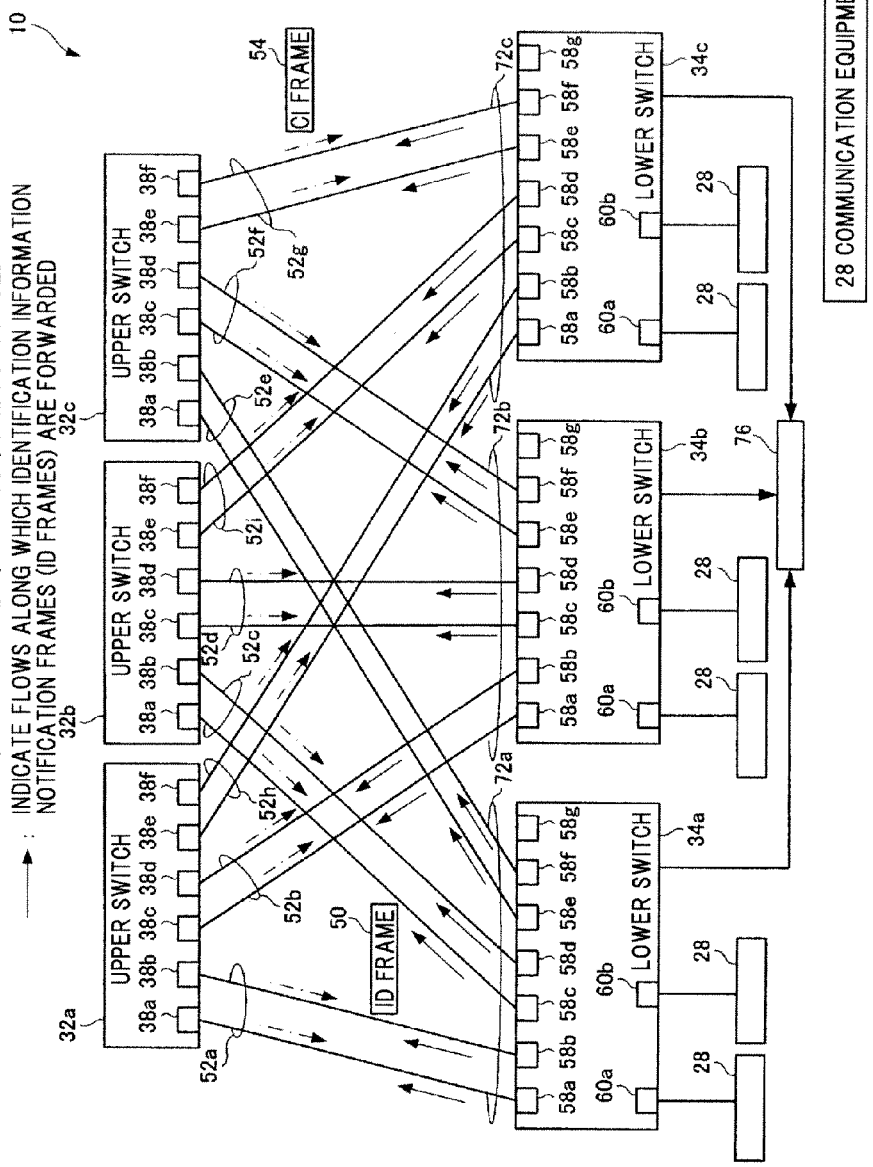
FIG. 24 is a diagram for explaining the operation example 1 of the network system in the second embodiment.

FIG. 24 is a diagram for explaining a determination operation of the network system 10, in the case of the completely connected state.

The network system 10 shown in FIG. 24 comprises three upper switches 32 and three lower switches 34, and each of the three upper switches 32 is connected to the three lower switches 34.

As shown in FIG. 23, the connection information table 82*c* registered in the lower switch 34 in FIG. 24 registers "34*a*, 34*b*, 34*c*" as the connected lower switch list informations 54*h* and "32*a*" as the upper switch identification information 54*g*, in association with the ports 58*a*, 58*b*. Also, the connection information table 82*c* registers "34*a*, 34*b*, 34*c*" as the connected lower switch list informations 54*h* and "32*h*" as the upper switch identification information 54*g* in association with the ports 58*c*, 58*d*. Also, the connection information table 82*c* registers "34*a*, 34*b*, 34*c*" as the connected lower switch list informations 54*h* and "32*c*" as the upper switch identification information M*g* in association with the ports 58*e*, 58*f*.

The connected lower switch list informations 54*h* registered in association with each of "32*a*," "32*b*," and "32*c*" as the upper switch identification information 54*g* in the connection information table 82*c* are all "34*a*, 34*b*, 34*c*" and match each other. Therefore, the comparison determination portion 74 of the lower switch 34*a* determines that it is in the completely connected state, and notifies the determined result to the monitoring terminal 76.

Also, the connected lower switch list informations 54*h* registered in the connection information table 82*c* of the lower switches 34*b*, 34*c* are all "34*a*, 34*b*, 34*c*," and match each other. Therefore, the comparison determination portion 74 of the lower switches 34*b*, 34*c* notifies the determined result indicative of the completely connected state to the monitoring terminal 76. Incidentally, in the case of the completely connected state, because of the communication enabled state, no communication state determination may be made.

(Operation Example 2: A Case of the Incompletely Connected State and the Communication Disabled State)

Figure 25:
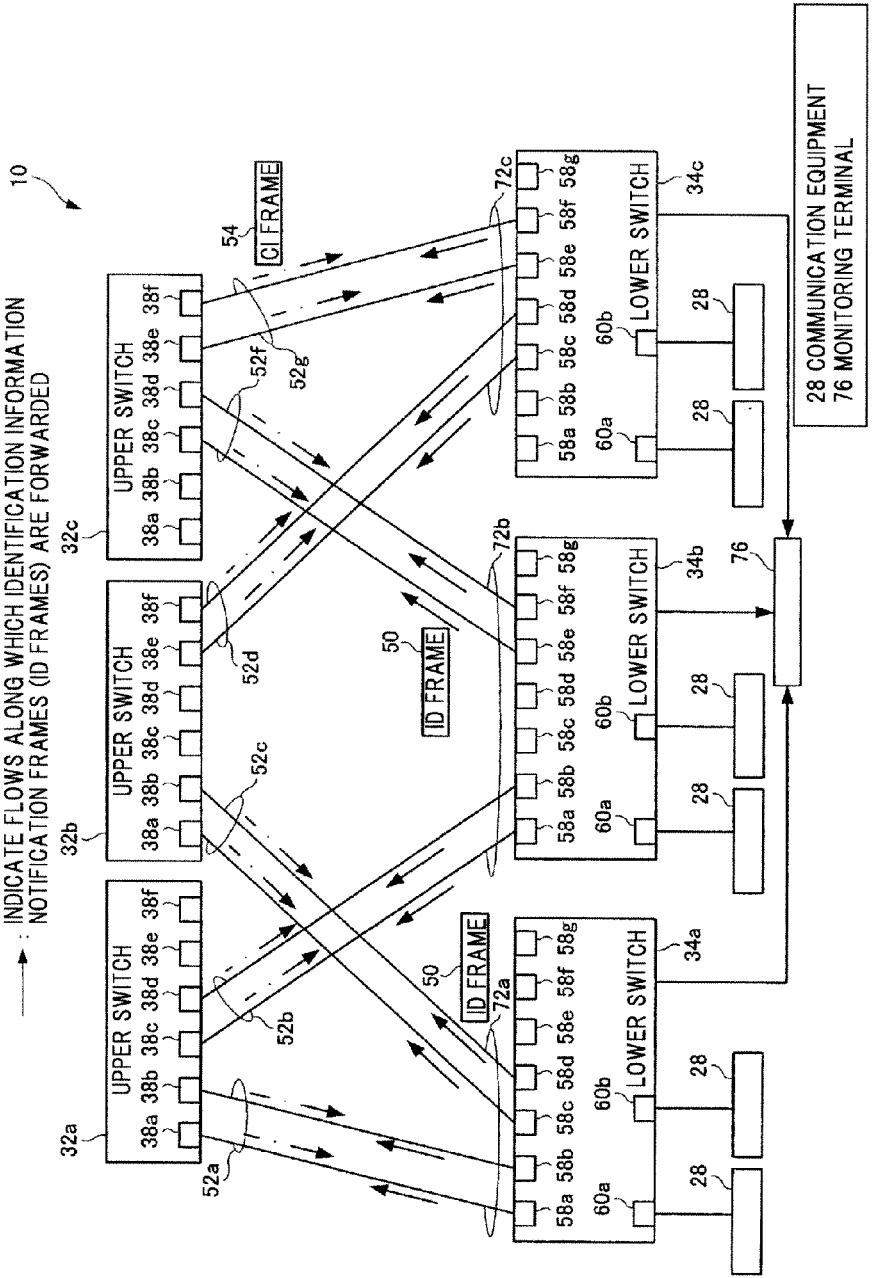
FIG. 25 is a diagram for explaining the operation example 2 of the network system in the second embodiment.

FIG. 25 is a diagram for explaining a determination operation of the network system 10, in the case of the incompletely connected state and the communication disabled state.

The network system 10 shown in FIG. 25 comprises three upper switches 32 and three lower switches 34, and the upper switch 32*a* is connected to the lower switches 34*a*, 34*b*, and the upper switch 32*b* is connected to the lower switches 34*a*, 34*c*. Also, the upper switch 32*c* is connected to the lower switches 34*b*, 34*c*.

FIGS. 26, 27 and 28 each show the contents of the connection information table 82*c* registered in the lower switches 34*a*, 34*b*, 34*c*. In the connection information table 82*c* of the lower switch 34*a* shown in FIG. 26, because "34*a*, 34*b*," which are the connected lower switch list informations 54*h* registered in association with "32*a*" as the upper switch identification information 54*g*, and "34*a*, 34*c*," which are the connected lower switch list informations 54*h* registered in association with "32*b*" as the upper switch identification information 54*g*, do not match each other, the comparison determination portion 74 of the lower switch 34*a* determines that it is in the incompletely connected state.

Next, the comparison determination portion 74 of the lower switch 34*a* first extracts the "34*a*," "34*b*," and "34*c*" from the connected lower switch list informations 54*h* registered in the connection information table 82*c* shown in FIG. 26. The comparison determination portion 74 determines whether or not the connected lower switch list informations 54*h* containing all of the "34*a*," "34*b*," and "34*c*" are being registered in the connection information table 82*c*. In this operation example, the determined result is no, and the comparison determination portion 74 of the lower switch 34*a* determines that it is in the communication disabled state.

Similarly, the comparison determination portion 74 of each of the lower switches 34*b*, 34*c* also determines that it is in the incompletely connected state and the communication disabled state. Then, the comparison determination portion 74 of each of the lower switches 34 notifies the determined result to the monitoring terminal 76.

Here, the determined result is verified. As clear from FIG. 25, when a user frame is transmitted from the lower switch 34a to the lower switch 34b and is relayed by the upper switch 32b, because the upper switch 32b is not being connected to the lower switch 34b, the user frame does not reach the lower switch 34b. Therefore, the determined result indicative of the communication disabled state is known correct.

(Operation Example 3: A Case of the Incompletely Connected State and the Communication Enabled State)

Referring to FIG. 14, a determination operation of the network system 10 in a case of an incompletely connected state and a communication enabled state will be described.

Each of the lower switches 34a, 34b create a connection information table 82c shown in FIG. 29. In the connection information table 82c, "34a, 34b" as the connected lower switch list informations 54h registered in association with "32a" or "32b" as the upper switch identification informations 54g, and "34a, 34b, 34c" as the connected lower switch list informations 54h registered in association with "32c" as the upper switch identification informations 54g do not match each other. For this, the comparison determination portion 74 of the lower switches 34a, 34b determines that it is in the incompletely connected state.

Next, the comparison determination portion 74 of each of the lower switches 34a, 34b extracts the "34a," "34b," and "34c" from among the connected lower switch list informations 54h registered in the connection information table 82c in FIG. 29. In the connection information table 82c, the connected lower switch list informations 54h sent from the upper switch 32c contain all of the "34a," "34b," and "34c" as the lower switch identification information 50f. Therefore, the comparison determination portion 74 of the lower switch 34 determines that it is in the communication enabled state.

And the comparison determination portion 74 of each of the lower switches 34a, 34b notifies the determined result to the monitoring terminal 76. It should be noted that the comparison determination portion 74 of the lower switch 34c performs no determination operation, because there is only one "32c" as the upper switch identification information 54g registered in the connection information table 82c (not shown).

Here, the determined result is verified. The upper switch 32c is connected to all the lower switches 34. Therefore, all the lower switches 34 are communicable via the upper switch 32c, and the determined result is known correct.

The network system 10 in the second embodiment described above can determine whether the network system 10 is in the completely connected state or incompletely connected state. By using this determined result, network administrator can know the incompletely connected state. The administrator can perform additional wiring based on the determined result, so that the network system 10 is in the completely connected state, thereby effectively utilizing bands of all the upper switches.

Also, the network system 10 in the second embodiment described above can determine whether the network system 10 is in the communication enabled state or communication disabled state. By using this determined result, the network administrator can know the communication disabled state. The administrator can perform additional wiring based on the determined result, so that the network system 10 is transitioned to the communication enabled state.

The invention is not limited to the first and second embodiments described above, but embodies modifications to each of the first and second embodiments. In the above-described first and second embodiments, the connection information notification frame 54 contains the connected lower switch number information 54f, the upper switch identification information 54g, and the connected lower switch list information 54h, but the format of the connection information notification frame 54 is not limited to that shown in FIG. 6.

For example, if the connected lower switch list information 54h is contained in the connection information notification frame 54, the connected lower switch list information 54h can be used as the connected lower switch number information. In other words, in the lower switch 34, if the number of connected lower switches 34 is computed based on the connected lower switch list information 54h as received, the LAG(s) 72 can be configured for the ports 58 in accordance with the number of connected lower switches 34 computed. That is, notifying the connected lower switch list information 54h to the lower switch 34 is equal to notifying the connected lower switch number information from the upper switches 32. Also, if the lower switch 34 can identify the upper switch 32 based on the source address in the connection information notification frame 54, the payload 54d of the connection information notification frame 54 may contain no upper switch identification information 54g.

In the identification information specifying portion 48 of the upper switch 32 in the above-described first embodiment and the second embodiment, the identification information table 42c is created, based on the identification information notification frame 50 received from the lower switch 34. However, if when configuring a link between the ports 38 and the ports 58, the administrator manually inputs the lower switch identification information 50f on the lower switch 34 as configuration information, the identification information specifying portion 48 of the upper switch 32 may create the identification information table 42c based on the lower switch identification information 50f contained in the configuration information.

That is, even if no identification information notification frame 50 is received from the lower switch 34, the upper switch 32 may be configured so as to be able to notify the connected lower switch number information to the lower switch 34. Also, the upper switch 32 may configure the LAG(s) 52 based on the lower switch identification information 50f input by the administrator, even if no lower switch identification information 50f is notified from the lower switch 34.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein configured forth.

What is claimed is:

1. A network system, comprising:
   lower switches; and
   upper switches connected to the lower switches,
   wherein each of the upper switches transmits a first notification frame containing a connected lower switch number information indicative of a number of the lower switches connected to said each of the upper switches, to the lower switches connected to said each of the upper switches, and
   wherein each of the lower switches configures a link aggregation group for ports which received the first notification frames each of which contains a maximum value of the connected lower switch number information among the connected lower switch number information contained in the received first notification frames.

2. The network system according to claim 1, wherein said each of the lower switches transmits a second notification frame containing an identification information on said each of the lower switches, to the upper switches connected to said each of the lower switches, and wherein said each of the upper switches determines the number of the lower switches connected to said each of the upper switches, based on the identification information contained in a received second notification frame.

3. The network system according to claim 2, wherein said each of the upper switches configures a link aggregation group for ports which received the second notification frame each of which contains a same identification information of the identification information contained in the second notification frames received by said each of the upper switches.

4. The network system according to claim 2, wherein said each of the first notification frames further contains a list information comprising the identification information indicative of the lower switches connected to said each of the upper switches, and wherein said each of the lower switches determines a connection state that some of the upper switches are not connected to some of the lower switches, when the list information contained in the first notification frames transmitted from the different upper switches do not match each other.

5. The network system according to claim 3, wherein said each of the first notification frames further contains a list information comprising the identification information indicative of the lower switches connected to said each of the upper switches, and wherein said each of the lower switches determines a connection state that some of the upper switches are not connected to some of the lower switches, when the list information contained in the first notification frames transmitted from the different upper switches do not match each other.

6. The network system according to claim 2, wherein said each of the first notification frames further contains a list information comprising the identification information indicative of the lower switches connected to said each of the upper switches, wherein said each of the lower switches extracts all of the identification information contained in the list information contained in the first notification frames received by said each of the lower switches, and wherein said each of the lower switches determines a connection state that there is no upper switch connected to all the lower switches, when all of the list information do not contain all of the extracted identification information.

7. The network system according to claim 3, wherein said each of the first notification frames further contains a list information comprising the identification information indicative of the lower switches connected to said each of the upper switches, wherein said each of the lower switches extracts all of the identification information contained in the list information contained in the first notification frames received by said each of the lower switches, and wherein said each of the lower switches determines a connection state that there is no upper switch connected to all the lower switches, when all of the list information do not contain all of the extracted identification information.

8. The network system according to claim 4, wherein said each of the lower switches extracts all of the identification information contained in the list information contained in the first notification frames received by the lower switches, and wherein said each of the lower switches determines a connection state that there is no upper switch connected to all the lower switches, when all of the list information do not contain all of the extracted identification information.

9. The network system according to claim 1, wherein said each of the upper switches and the lower switches comprises a switching hub.

10. The network system according to claim 1, wherein the upper switches and the lower switches comprise switching hubs with a layer data forwarding function in an OSI (Open Systems Interconnection) reference model.

11. The network system according to claim 10, wherein the switching hubs comprise box-type switching hubs.

12. The network system according to claim 1, wherein said each of the upper switches and said each of the lower switches comprise a box-type switching hub.

13. The network system according to claim 1, wherein said each of the upper switches determines the number of the lower switches connected to said each of the upper switches based on identification information contained in a second notification frame transmitted from said each of the lower switches.

14. The network system according to claim 1, wherein said each of the lower switches transmits a second notification frame, including identification information on said each of the lower switches, to the upper switches.

15. The network system according to claim 14, wherein said each of the upper switches configures a link aggregation group for ports which receive the second notification frame.

16. The network system according to claim 1, wherein said each of the first notification frames further contains a list information comprising identification information on said each of the lower switches indicative of the lower switches connected to said each of the upper switches.

17. The network system according to claim 16, wherein said each of the lower switches determines a connection state that a group of switches of the upper switches are not connected to a group of switches the lower switches.

18. The network system according to claim 16, wherein said each of the lower switches extracts all of the identification information contained in the list information contained in the first notification frames received by said each of the lower switches.

19. The network system according to claim 18, wherein said each of the lower switches determines a connection state that there is no upper switch connected to all the lower switches when all of the list information do not contain all of the extracted identification information.

20. The network system according to claim 19, wherein the upper switches and the lower switches comprise box-type switching hubs with a layer data forwarding function in an OSI (Open Systems Interconnection) reference model.

* * * * *